US012026555B2

(12) United States Patent
Gomes

(10) Patent No.: US 12,026,555 B2
(45) Date of Patent: Jul. 2, 2024

(54) ADJUNCT PROCESSOR COMMAND-TYPE FILTERING

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 643 days.

(21) Appl. No.: 17/122,363

(22) Filed: Dec. 15, 2020

(65) Prior Publication Data

US 2022/0188168 A1  Jun. 16, 2022

(51) Int. Cl.
G06F 9/50 (2006.01)
G06F 9/455 (2018.01)

(52) U.S. Cl.
CPC ........ G06F 9/5044 (2013.01); G06F 9/45558 (2013.01)

(58) Field of Classification Search
CPC .......................... G06F 9/5044; G06F 9/45558
See application file for complete search history.

(56) References Cited

U.S. PATENT DOCUMENTS 8,261,054 B2  9/2012 Smith
8,584,229 B2  11/2013 Brutch et al.
(Continued)

FOREIGN PATENT DOCUMENTS

CN  106687923 A  5/2017
CN  111045594 A  4/2020
(Continued)

OTHER PUBLICATIONS

Notification of Transmittal of the International Search Report and the Written Opinion of the International Searching Authority, PCTCN2021132683, Feb. 22, 2022, (9 pages).
(Continued)

*Primary Examiner* — Lewis A Bullock, Jr.
*Assistant Examiner* — Kevin X Lu
(74) *Attorney, Agent, or Firm* — Edward J. Wixted, III; Blanche E. Schiller, Esq.; Heslin Rothenberg Farley & Mesiti P.C.

(57) ABSTRACT

Adjunct processor command-type filtering includes determining whether a target adjunct processor is configured to support a selected command-type filtering mode, and whether another adjunct processor is configured to support the selected command-type filtering mode. Based on determining that the target adjunct processor is not configured to support the selected command-type filtering mode and based on the other adjunct processor being configured to support the selected command-type filtering mode, a command is forwarded to the other adjunct processor for processing to determine whether the command is valid for the selected command-type filtering mode. An indication is obtained, based on processing at the other adjunct processor, of whether the command is valid for the selected command-type filtering mode. Based on obtaining an indication that the command is valid for the selected command-type filtering mode, the command is sent to the target adjunct processor for execution.

25 Claims, 13 Drawing Sheets

(56) References Cited

U.S. PATENT DOCUMENTS

| | | | |
|---|---|---|---|
| 9,471,313 B1* | 10/2016 | Busaba | G06F 9/467 |
| 10,476,841 B2 | 11/2019 | Gaddehosur et al. | |
| 10,846,113 B1* | 11/2020 | Trier | G06F 8/65 |
| 11,513,818 B1* | 11/2022 | Chen | G06F 9/44521 |
| 2002/0131368 A1 | 9/2002 | Raftelis | |
| 2009/0213758 A1* | 8/2009 | Girolamo | H04W 24/02 |
| | | | 370/254 |
| 2010/0100656 A1 | 4/2010 | Gainey | |
| 2011/0083161 A1 | 4/2011 | Ishida | |
| 2012/0042145 A1* | 2/2012 | Sehr | G06F 21/53 |
| | | | 711/E12.091 |
| 2012/0084777 A1* | 4/2012 | Jayamohan | G06F 9/5077 |
| | | | 718/1 |
| 2012/0167097 A1 | 6/2012 | Condorelli | |
| 2012/0311095 A1 | 12/2012 | Rahardja | |
| 2014/0181453 A1 | 6/2014 | Jayasena | |
| 2015/0178497 A1* | 6/2015 | Lukacs | G06F 9/461 |
| | | | 718/108 |
| 2016/0218988 A1* | 7/2016 | Huang-Fu | H04W 28/12 |
| 2017/0115984 A1* | 4/2017 | Lu | G06F 8/654 |
| 2017/0123965 A1* | 5/2017 | Abdirashid | G06F 11/3688 |
| 2019/0042258 A1* | 2/2019 | Opferman | G06F 9/45558 |
| 2019/0347542 A1* | 11/2019 | Chen | G06T 1/20 |
| 2020/0110695 A1* | 4/2020 | Maciel | G06F 11/3688 |
| 2020/0167488 A1* | 5/2020 | Yitbarek | G06F 21/76 |
| 2020/0320226 A1* | 10/2020 | Chitrak Gupta | G06F 21/6218 |
| 2020/0409708 A1* | 12/2020 | Opferman | G06F 9/30003 |
| 2021/0096908 A1* | 4/2021 | Opferman | G06F 9/30098 |

FOREIGN PATENT DOCUMENTS

| | | |
|---|---|---|
| WO | WO9961982 A1 | 2/1999 |
| WO | WO03042819 A1 | 5/2003 |

OTHER PUBLICATIONS

Notification of Transmittal of the International Search Report and the Written Opinion of the International Searching Authority, PCTEP2021082175, Feb. 22, 2022, (11 pages).

IBM, "z/Architecture—Principles of Operation," IBM Publication No. SA22-7832-11, Twelfth Edition, Sep. 2017, pp. 1-1902.

Mell, Peter and Tim Grance, "The NIST Definition of Cloud Computing," National Institute of Standards and Technology, Information Technology Laboratory, Special Publication 800-145, Sep. 2011, pp. 1-7.

Ishiguro, Kenta et al., "Instruction Filters for Mitigating Attacks on Instruction Emulation in Hypervisors," IEICE Trans. Inf. & Syst., vol. E103-D, No. 7, Jul. 2020, pp. 1660-1671.

Gomes, Louis P. et al., "Command Filtering Based On Per-Command Filtering Indicator," U.S. Appl. No. 17/122,346, filed Dec. 15, 2020, pp. 1-55.

List of IBM Patents or Patent Applications Treated As Related, Mar. 8, 2021, 2 pages.

Patents Act 1977: Examination Report under Section 18(3), Application No. GB2310175.1, Aug. 29, 2023, 5 pages.

Response to Examination Report under Section 18(3) dated Aug. 29, 2023, Application No. GB2310175.1 3 pages.

Patents Act 1977: Examination Report under Section 18(3), GB2310175. 1, Oct. 30, 2023, 3 pages.

* cited by examiner

DETERMINE WHETHER A TARGET ADJUNCT PROCESSOR OF A PLURALITY OF ADJUNCT PROCESSORS OF THE COMPUTING ENVIRONMENT IS CONFIGURED TO SUPPORT A SELECTED COMMAND-TYPE FILTERING MODE — 500

CHECK WHETHER ANOTHER ADJUNCT PROCESSOR OF THE PLURALITY OF ADJUNCT PROCESSORS IS CONFIGURED TO SUPPORT THE SELECTED COMMAND-TYPE FILTERING MODE — 502

FORWARD A COMMAND TO THE OTHER ADJUNCT PROCESSOR FOR PROCESSING TO DETERMINE WHETHER THE COMMAND IS VALID FOR THE SELECTED COMMAND-TYPE FILTERING MODE, BASED ON DETERMINING THAT THE TARGET ADJUNCT PROCESSOR IS NOT CONFIGURED TO SUPPORT THE SELECTED COMMAND-TYPE FILTERING MODE AND BASED ON THE OTHER ADJUNCT PROCESSOR BEING CONFIGURED TO SUPPORT THE SELECTED COMMAND-TYPE FILTERING MODE — 504

OBTAIN AN INDICATION OF WHETHER THE COMMAND IS VALID FOR THE SELECTED COMMAND-TYPE FILTERING MODE, BASED ON PROCESSING AT THE OTHER ADJUNCT PROCESSOR — 506

SEND THE COMMAND TO THE TARGET ADJUNCT PROCESSOR FOR EXECUTION, BASED ON OBTAINING AN INDICATION THAT THE COMMAND IS VALID FOR THE SELECTED COMMAND-TYPE FILTERING MODE — 508

REJECT THE COMMAND AS INVALID FOR THE SELECTED COMMAND-TYPE FILTERING MODE AND REFRAIN FROM EXECUTING THE COMMAND ON THE TARGET ADJUNCT PROCESSOR, BASED ON OBTAINING AN INDICATION THAT THE COMMAND IS INVALID FOR THE SELECTED COMMAND-TYPE FILTERING MODE — 510

PLACE AN ERROR CODE IN A CENTRAL LOCATION TO FACILITATE ACCESS TO THE ERROR CODE — 512

THE SELECTED COMMAND-TYPE FILTERING MODE IS A STATELESS COMMAND FILTERING MODE — 514

THE PLURALITY OF ADJUNCT PROCESSORS INCLUDES A PLURALITY OF CRYPTOGRAPHIC CARDS — 516

FIG. 5A

ADD THE COMMAND TO A COMMAND LIST AS A SELECTED COMMAND-TYPE FILTERING MODE COMMAND, BASED ON OBTAINING AN INDICATION THAT THE COMMAND IS VALID FOR THE SELECTED COMMAND-TYPE FILTERING MODE ~518

THE COMMAND LIST TO BE USED TO DETERMINE WHICH COMMANDS ARE VALID FOR EXECUTION ON THE TARGET ADJUNCT PROCESSOR ~520

ADD THE COMMAND TO THE COMMAND LIST AS A VALID ADJUNCT PROCESSOR COMMAND, BASED ON OBTAINING AN INDICATION THAT THE COMMAND IS INVALID FOR THE SELECTED COMMAND-TYPE FILTERING MODE ~522

REJECT THE COMMAND BASED ON DETERMINING THAT THE PLURALITY OF ADJUNCT PROCESSORS IS NOT CONFIGURED TO SUPPORT THE SELECTED COMMAND-TYPE FILTERING MODE ~524

DETERMINE, BASED ON DETERMINING THAT THE TARGET ADJUNCT PROCESSOR IS NOT CONFIGURED TO SUPPORT THE SELECTED COMMAND-TYPE FILTERING MODE AND BASED ON THE OTHER ADJUNCT PROCESSOR BEING CONFIGURED TO SUPPORT THE SELECTED COMMAND-TYPE FILTERING MODE, WHETHER THE COMMAND IS ON A COMMAND LIST, THE COMMAND LIST TO BE USED TO DETERMINE WHETHER THE COMMAND IS TO BE EXECUTED ON THE TARGET ADJUNCT PROCESSOR ~526

FORWARD THE COMMAND TO THE OTHER ADJUNCT PROCESSOR FOR PROCESSING, BASED ON DETERMINING THAT THE COMMAND IS NOT ON THE COMMAND LIST ~528

ADD THE COMMAND TO THE COMMAND LIST AS A VALID SELECTED COMMAND-TYPE FILTERING MODE COMMAND, BASED ON SUCCESSFUL EXECUTION OF THE COMMAND ON THE OTHER ADJUNCT PROCESSOR ~530

ADD THE COMMAND TO THE COMMAND LIST AS A VALID ADJUNCT PROCESSOR COMMAND, BASED ON UNSUCCESSFUL EXECUTION OF THE COMMAND ON THE OTHER ADJUNCT PROCESSOR ~532

FIG. 5B

ADJUNCT PROCESSOR COMMAND-TYPE FILTERING

BACKGROUND

One or more aspects relate, in general, to facilitating processing within a computing environment, and in particular, to facilitating processing associated with command processing within the computing environment.

Computing environments often include different types of processors to enhance processing. As an example, a computing environment may include one or more central processing units, which are considered the main processors, and one or more adjunct processors that are considered subordinate to the central processing units. An adjunct processor typically performs specific types of tasks. For instance, a particular example of an adjunct processor is a cryptographic (crypto) card which is used to perform cryptographic operations.

An example of a cryptographic card offered by International Business Machines Corporation, Armonk, New York, is a channel attached Crypto Express card. A Crypto Express card is defined to support multiple types of commands, such as commands using encrypted keys (referred to as secure-key commands), commands using clear keys (referred to as clear-key commands), hash commands, query commands, random number generator commands, etc. Further, a Crypto Express card is designed to support multiple modes, including, for instance: a Common Cryptographic Architecture (CCA) mode, an accelerator mode, and an Enterprise Public Key Cryptographic Standards (PKCS) mode (a.k.a., XCP/EP11—Enterprise PKCS #11 mode). Each mode is configured to process specific types of commands.

A Crypto Express card can be configured to operate in one of the different multiple modes for the duration of the activated machine configuration. Therefore, if a customer wishes to use the different modes, the computing environment would include at least the number of cards for the different multiple modes, each one configured in a different mode and able to process specific types of commands as defined for that mode.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes determining whether a target adjunct processor of a plurality of adjunct processors of the computing environment is configured to support a selected command-type filtering mode and checking whether another adjunct processor of the plurality of adjunct processors is configured to support the selected command-type filtering mode. Based on determining that the target adjunct processor is not configured to support the selected command-type filtering mode and based on the other adjunct processor being configured to support the selected command-type filtering mode, a command is forwarded to the other adjunct processor for processing to determine whether the command is valid for the selected command-type filtering mode. An indication is obtained, based on processing at the other adjunct processor, of whether the command is valid for the selected command-type filtering mode. The command is sent to the target adjunct processor for execution, based on obtaining an indication that the command is valid for the selected command-type filtering mode.

By processing the command by the other adjunct processor, execution of the command is simulated so that it is known whether the command is valid for execution on the target adjunct processor. The simulation eliminates the need for maintaining a static list of adjunct processor commands of each command-type filtering mode for each adjunct processor type that is supported. Thus, processing is facilitated, and performance is improved.

In one embodiment, the command is rejected as invalid for the selected command-type filtering mode and it is refrained from execution on the target adjunct processor, based on obtaining an indication that the command is invalid for the selected command-type filtering mode. Thus, processing is facilitated and performance is improved by simulating the command on the other adjunct processor and determining that the command is invalid in the selected command-type filtering mode, and therefore, is not to be executed on the target adjunct processor, as requested.

In one embodiment, the rejecting includes placing an error code in a central location to facilitate access to the error code. Using a central place, that is independent of the adjunct processor modes, to return the error code facilitates locating the error codes by the program regardless of who generates the error (e.g., the hypervisor using command-type filtering simulation, the adjunct processor in a particular mode, etc.).

In one embodiment, the command is added to a command list as a selected command-type filtering mode command, based on obtaining an indication that the command is valid for the selected command-type filtering mode. The command list is to be used to determine which commands are valid for execution on the target adjunct processor. Further, in one embodiment, the command is added to the command list as a valid adjunct processor command, based on obtaining an indication that the command is invalid for the selected command-type filtering mode. The command list, which is dynamically updated, facilitates processing and improves performance by facilitating a determination of which commands are valid for the target processor. The command list, however, is optional, since the commands may be simulated on one or more adjunct processors that support the selected command-type filtering mode(s).

In one embodiment, the command is rejected based on determining that the plurality of adjunct processors is not configured to support the selected command-type filtering mode. In one embodiment, simulation is not performed if none of the adjunct processors support the selected command-type filtering mode; thereby, processing is facilitated, and performance is improved.

In one embodiment, based on determining that the target adjunct processor is not configured to support the selected command-type filtering mode and based on the other adjunct processor being configured to support the selected command-type filtering mode, a determination is made as to whether the command is on a command list, the command list to be used to determine whether the command is to be executed on the target adjunct processor. The command is forwarded to the other adjunct processor for processing, based on determining that the command is not on the command list. The command list, which is dynamically updated, facilitates processing and improves performance by facilitating a determination of which commands are valid for the target adjunct processor.

In one embodiment, the command is added to the command list as a valid selected command-type filtering mode command, based on successful execution of the command on the other adjunct processor. In one embodiment, the command is added to the command list as a valid adjunct processor command, based on unsuccessful execution of the command on the other adjunct processor.

As an example, the selected command-type filtering mode is a stateless command filtering mode. Further, as an example, the plurality of adjunct processors comprises a plurality of cryptographic cards.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 5A-5B depict one embodiment of aspects related to facilitating processing within a computing environment, in accordance with one or more aspects of the present invention;

DETAILED DESCRIPTION

Figure 1A:
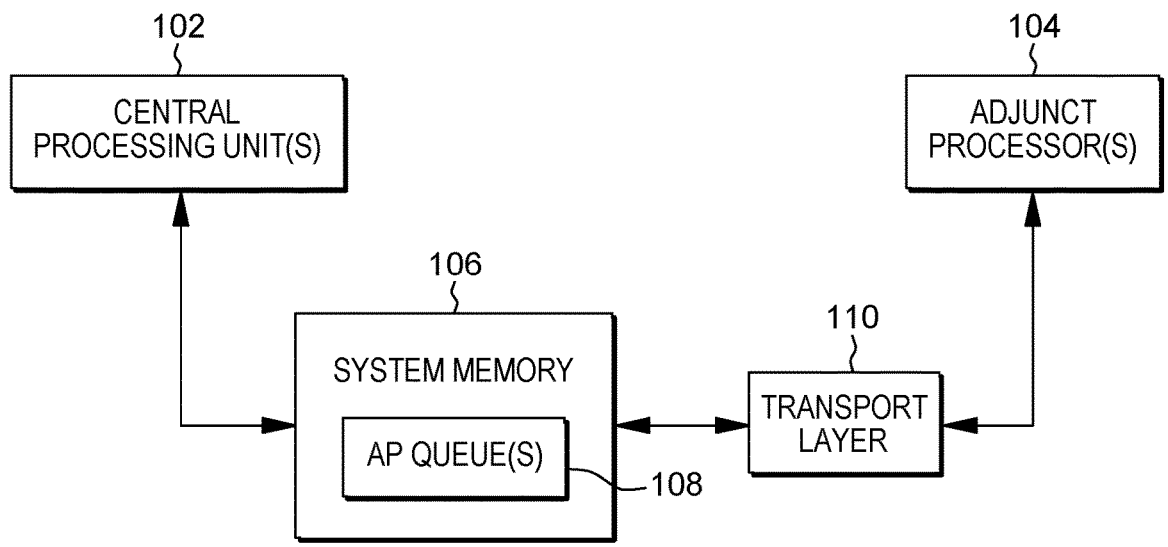
FIG. 1A depicts one example of a computing environment to incorporate and use one or more aspects of the present invention.

In one or more aspects of the present invention, a filtering capability is provided that enables an adjunct processor, such as a cryptographic (crypto) card, to dynamically determine, on a per-command basis, whether a command obtained by the adjunct processor is to be executed by the adjunct processor. For instance, one or more per-command filtering indicators (e.g., selected command-type filtering indicators) are used to determine whether a received command is a valid command type as specified by the per-command filtering indicators and thus, is to be executed by the adjunct processor. In one embodiment, the one or more per-command filtering indicators are set per command based on a computing policy associated with a requester of the command. Thus, a command issued by one requester may be a valid command type for execution, but issued by another requester may be invalid, as specified by the per-command filtering indicators set based on computing policies of the requesters.

In one or more aspects, in order for an adjunct processor to participate in per-command filtering, at least one filtering facility is to be installed on the adjunct processor. There may be different filtering facilities installed and each facility has at least one associated filtering indicator (e.g., selected command-type filtering indicator) to be used in per-command filtering. One example of a filtering facility is a stateless command filtering facility in which selected command types (e.g., stateless command-type commands) are valid for execution. For instance, if an adjunct processor supports, e.g., the stateless command filtering facility and a received command has a stateless command-type filtering indicator set to a select value, e.g., one, then the command is to be a stateless command-type command to be executed. If the command is another command type, even one supported by the configured mode of the adjunct processor (e.g., Common Cryptographic Architecture (CCA) mode; a.k.a., co-processor mode), it would be considered invalid. However, if the stateless command-type filtering indicator in the command is set to another value, e.g., zero, then the command is to be any command type supported by the configured mode of the adjunct processor to be executed. Thus, in one example, when a filtering facility is supported, such as a stateless command filtering facility, the adjunct processor configured in one mode, referred to herein as a command set mode, can be used to either execute a full set of command types supported in the configured mode (e.g., a co-processor mode) or a reduced set of command types (e.g., only stateless command-type commands).

Although the stateless command filtering facility is described herein as one example, other filtering facilities or techniques may be applied. For example, a master key filtering facility may be used in which the selected command types are master key management key commands. As another example, filtering may be implemented with policy imposed use case limits. For instance, if a selected command access is priced differently from general cryptography command accesses, a filter may be imposed for the purchased use case. A further level of filtering may be based on a performance service agreement, where commands are noted with high or low service response performance priorities based on the purchased performance. Other filtering facilities or techniques may also be used. The application of each of the filtering facilities is permissible without reconfiguring the adjunct processor for another mode. The filtering facilities may be used in conjunction with or separate from one another. Many examples are possible.

In one or more aspects, a computing environment includes a plurality of adjunct processors and one or more of the adjunct processors may not support command-type filtering and/or a particular command-type filtering facility. Therefore, in one embodiment, based on obtaining a command request, a determination is made as to whether the target adjunct processor of the request supports the filtering facility (also referred to as a command-type filtering mode) indicated by the request. If the target adjunct processor does not support the requested facility but another adjunct processor does, then in accordance with an aspect of the present invention, operation of the command of the selected command-type filtering mode is simulated by executing the command on the other adjunct processor. If execution of the command on the other adjunct processor is valid, then the command is executed on the target processor.

One embodiment of a computing environment to incorporate and use one or more aspects of the present invention is described with reference to FIG. 1A. In one example, a computing environment 100 includes at least one central processing unit 102 and at least one adjunct processor (AP) 104, each of which is coupled to at least a portion of memory, referred to as system memory 106. As one example, system memory 106 includes a hardware system area, which is indirectly accessible and not visible to programs executing on the central processing unit(s). (Indirectly accessible is used herein to mean that the hardware system area or adjunct processor queue(s) stored therein (described below) are only accessible by specific limited instructions and not otherwise accessible (e.g., cannot load into it, programs are unaware of addresses, etc.)). Located within the system memory are one or more adjunct processor queues 108. These queues are not directly visible from user programs and are instead considered a part of the machine (i.e., the machine that includes the central processing unit(s), system memory and adjunct processor(s)). A central processing unit has access to the queues in system memory by, for instance, issuing instructions to place requests on the queue, and/or to remove replies from the queue. The adjunct processor, however, does have direct access to the queues via, e.g., a transport layer 110 (e.g., i390CO), and is responsible for taking requests off the queue, processing the requests, and placing replies to the requests on the queue.

Another embodiment of a computing environment to incorporate and use one or more aspects of the present invention is described with reference to FIG. 1B. In this embodiment, the machine includes virtual support, and there is at least one host central processing unit 150 that includes a plurality of guests 152 (e.g., guest operating systems and/or guest programs). The host central processing unit is coupled to at least a portion of memory, referred to as system memory 154. Additionally, there is at least one adjunct processor 156, which is also coupled to system memory 154 via, for instance, a transport layer 160. As one example, system memory 154 includes a hardware system area, and located within the system memory are one or more adjunct processor queues 158.

As indicated, there are different types of adjunct processors, including but not limited to, cryptographic cards or adapters. A specific example of a cryptographic card is a Crypto Express card offered by International Business Machines Corporation, Armonk, New York Although an example cryptographic card is provided, other cryptographic cards offered by International Business Machines Corporation and/or other companies may incorporate and/or use one or more aspects of the present invention. Further, other types of adjunct processors may incorporate and/or use one or more aspects of the present invention.

In one embodiment, an adjunct processor, such as a cryptographic card (e.g., a Crypto Express card), supports a plurality of modes including, but not limited to, a co-processor mode, an accelerator mode, and an Enterprise Public Key Cryptographic Standards (PKCS) mode (e.g., XCP/EP11—Enterprise PKCS #11), as examples. Additional, fewer and/or other modes may be supported in other examples. Each of the modes may have its own AP message structures and formats.

As an example, an adjunct processor message is comprised of multiple data segments and the data segments may not be adjacent to each other; instead, one or more may be interleaved. These data segments are referred to as scatter gather data segments. In one example, a cryptographic card does not have direct access to the enqueued AP message and a portion of the message (e.g., the bottom part of the AP message) contains the data to be used by, e.g., the cryptographic card to execute the AP command. Therefore, the AP command transport layer (e.g., transport layer 110, 160) copies the relevant data from the AP command request message, packages it in a format that the cryptographic card understands (e.g., crypto card's command request message) and sends it to the cryptographic card. Similarly, after the AP command is executed by the cryptographic card, the cryptographic card generates a cryptographic card command reply message that includes, e.g., packets 5 and 6, and sends it to the AP command transport layer, which re-packages it into an AP command reply message. For instance, the transport layer uses various parts of the AP command request message and the cryptographic card's command reply message to provide the AP command reply message, including the header, sub-header and packets. The transport layer then sends the AP command reply message to the AP queue to be dequeued later by the program. Further details of an AP command request message and an AP command reply message are described below, including aspects of the messages used in accordance with command-type filtering of one or more aspects of the present invention.

In accordance with an aspect of the present invention, an adjunct processor (e.g., a cryptographic card) is designed that allows the machine hypervisor to request command-type filtering according to computing policies (e.g., the license terms, permissions and/or resource requirements, such as high availability requirements, of customers; etc.). Since customers have different computing policies associated therewith (e.g., license terms, permissions and/or resource requirements, such as high availability requirements), not all types of commands may be available to a particular customer. Thus, in accordance with an aspect of the present invention, command-type filtering is provided such that a selected adjunct processor (e.g., a cryptographic card configured for a particular mode (e.g., co-processor mode)) is able to be used for customer's with different computing policies, and thus, different permissions, without requiring the adjunct processor to be re-configured into a different supported mode.

As an example, an AP command-type filtering facility (APFT) is provided that allows AP commands to be filtered based on one or more selected AP command-type filtering facilities on a per-command basis, in accordance with one or more aspects of the present invention. In one example, the one or more selected AP command-type filtering facilities includes a stateless AP command filtering facility (SAPCF). Aspects of the AP command-type filtering facility and the stateless AP command filtering facility are described herein with respect to a particular architecture, such as the z/Architecture® hardware architecture, offered by International Business Machines Corporation, Armonk, New York One embodiment of the z/Architecture hardware architecture is described in "z/Architecture Principles of Operation," IBM Publication No. SA22-7832-12, Thirteenth Edition, September 2019, which is hereby incorporated herein by reference in its entirety. IBM and Z/ARCHITECTURE are registered trademarks of International Business Machines Corporation in at least one jurisdiction. The z/Architecture hardware architecture, however, is only one example architecture. Aspects of the invention may also be based on other architectures, including, but not limited to, the Intel x86 architectures, other architectures of International Business Machines Corporation, and/or architectures of other companies.

In one example, when the stateless AP command filtering facility is installed, the AP command-type filtering facility is installed. To determine whether the stateless AP command filtering facility is installed, a Process Adjunct Processor Queue instruction is used, in accordance with an aspect of the present invention.

Figure 2A:
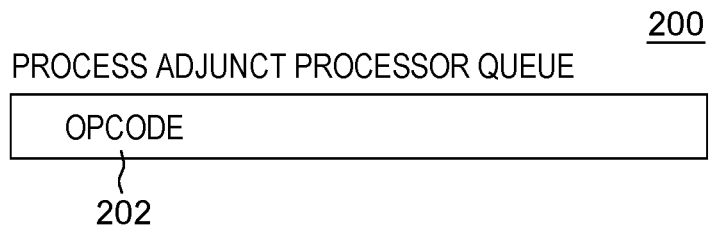
FIGS. 2A-2D depict an example of a Process Adjunct Processor Queue instruction used in accordance with one or more aspects of the present invention.

One example of a Process Adjunct Processor Queue (PQAP) instruction is described with reference to FIG. 2A. As shown, in one example, a Process Adjunct Processor Queue instruction 200 includes an operation code (opcode) 202 (e.g., bits 0-15 of a 32-bit instruction) that indicates a process operation of an adjunct processor queue. In one embodiment, the Process Adjunct Processor Queue instruction employs a plurality of general registers, including general registers 0, 1 and 2. The AP queue designated by the AP queue number (APQN) in general register 0 is processed according to the function code specified in general register 0. Examples of general registers 0, 1 and 2 are further described below.

Figure 1B:
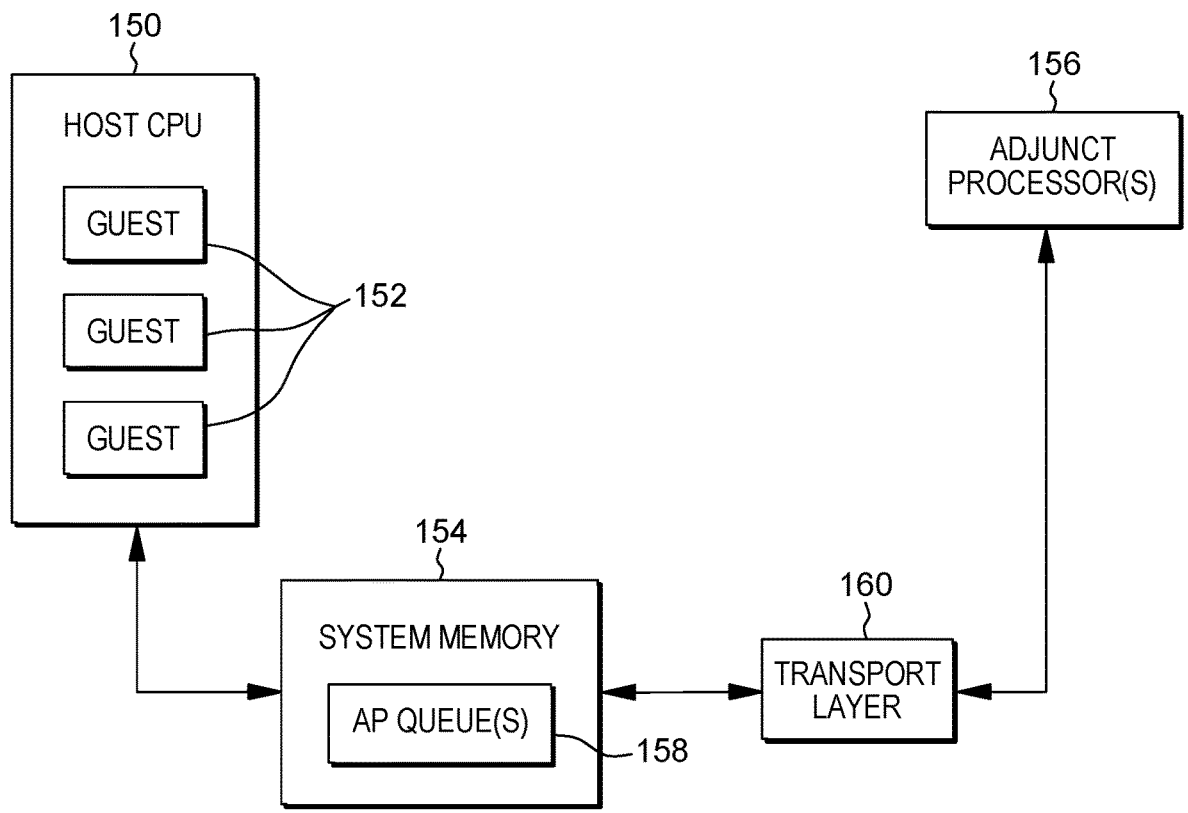
FIG. 1B depicts another example of a computing environment to incorporate and use one or more aspects of the present invention.
Figure 2B:
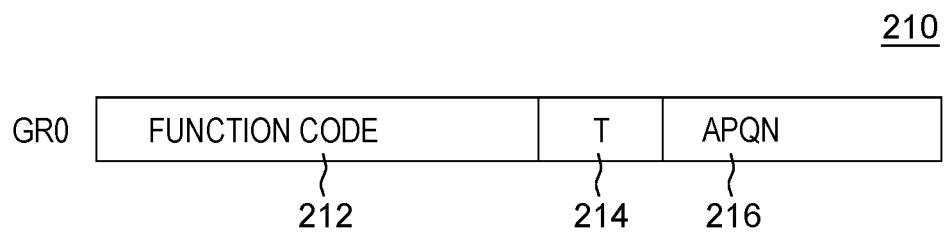

Referring to FIG. 2B, in one embodiment, general register 0 (GR0) 210 is, e.g., a 64-bit register that includes, for instance, a function code (FC) 212 (e.g., bits 32-39) to indicate a selected function to be performed; a test facilities indicator (T) 214 (e.g., bit 40) used to indicate whether a mask of installed facilities is provided in general register 2; and an adjunct processor queue number (APQN) 216 (e.g., bits 48-63) identifying an adjunct processor queue (e.g., AP queue 108 (FIG. 1A); AP queue 158 (FIG. 1B)) processed according to the function code.

Based on issuing the Process Adjunct Processor Queue instruction, function code 212 is to include one of a plurality of acceptable codes, an example of which is code 00 Test AP Queue (TAPQ).

In accordance with one or more aspects of the present invention, when the computing environment is in, e.g., z/Architecture architectural mode, and the APFT facility is installed, if the TAPQ function code is specified (e.g., FC=00 in GR0), bit 40 of general register 0 is defined as the test facilities bit (T) 214 for the TAPQ function. When T is one, bits 0-31 of general register 2 are replaced with a mask of installed AP facilities and other associated information, an example of which is described below. When T is zero, indicating, for instance, that the APFT facility is not installed, the results in general register 2 are confined to, e.g., bit positions 32-63, and bit positions 0-31 are ignored and unchanged. In this case, the AT and QD fields (described below) are valid and the other bit positions are stored as zeros.

As indicated, in addition to general register 0, general registers 1 and 2 are used by the Process Adjunct Processor Queue instruction, each of which is further described herein.

Figure 2C:
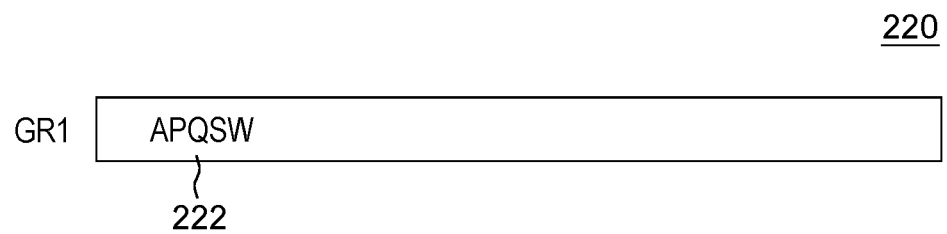

Referring to FIG. 2C, in one embodiment, general register 1 (GR1) 220 is, e.g., a 64-bit register that includes, for instance, an adjunct processor queue status word (APQSW) 222 (e.g., bits 32-63). At completion of the Process Adjunct Processor Queue instruction, the APQSW field contains an AP queue status word unless stated otherwise for a particular function. The AP queue status word indicates, e.g., the state of the AP queue at the completion of the instruction.

Figure 2D:
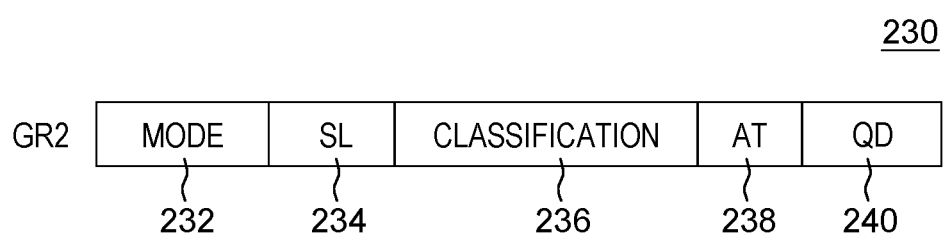

Further, with reference to FIG. 2D, in one embodiment, general register 2 (GR2) 230 is, e.g., a 64-bit register that includes a plurality of fields. As described herein, in one embodiment, bit positions 0-31, when set, include a mask of installed AP facilities and other associated information. Example fields of GR2, in accordance with one or more aspects of the present invention include, for instance:

Mode 232: When set, this field (e.g., bits 3-5) indicates a plurality of possible AP mode facilities. For instance, when D (e.g., bit 3) is one, the specified AP provides the co-processor mode facility; when A (e.g., bit 4) is one, the specified AP provides the accelerator mode facility; and when X (e.g., bit 5) is one, the specified AP provides the XCP mode facility;

SL 234: When this field (e.g., bit 7) is one, the stateless AP command filtering facility (SAPCF) of one or more aspects of the present invention is installed. The SAPCF facility is, for instance, a PCI-X (Peripheral Component Interconnect eXtended) crypto device feature and it is installed in, e.g., z/Architecture architectural mode, in one embodiment;

Classification 236: This field (e.g., bits 8 to 15) contains information regarding the functional capabilities of the specified adjunct processor (AP). Each bit represents a certain functional capability in conjunction with the facility provided by the adjunct processor as indicated in a mode field of the register (e.g., bits 3-5). If zeros are stored to, e.g., bits 8 to 15 of the classification field, full native card functions are available for the specified AP. The classification field is not a PCI-X crypto device feature and is not set by the system firmware. Rather, it is optionally set by the hypervisor to provide either the full native card functions or one or more subsets of the full native card functions to one or more of its guests based on the guests' privilege. As examples, bit 8 indicates Full AP Command Set (FAPCS) facility. When bit 8 is set to one value (e.g., one), it indicates that full native card functions are available for the specified adjunct processor. When bit 8 is set (e.g., to one), zero (in one example) is stored in bit 9. Bit 9 indicates, for instance, a Stateless AP Command (SAPC) Facility. When bit 9 is set to one value (e.g., one), it indicates that only stateless functions are available for the specified adjunct processor. When bit 9 is set (e.g., to one), zero (in one example) is stored in bit 8. Bits 10-15 are reserved in one example.

Other facilities and/or information related to one or more facilities that may be supported by the computing environment may be indicated by one or more bits of the mask in, e.g., bits 0-31.

Adjunct Processor Type (AT) 238: This field (e.g., bit positions 32-39) includes example valid AP-type values in the range of, e.g., 0-255 indicating various adjunct processor types;

Number of AP Queue Entries (QD) 240: The number of queue entries on each AP queue in the configuration. QD is a value in the range, e.g., 0-31, representing a number of queue entries in the range, e.g., 1-32 decimal, as an example.

In one example, the installed facility information returned in general register 2 applies to all APs of the same AP type and—for consolidated APs (e.g., AP type 10 or higher)—in the same configuration mode. The installed facility information is, in one example, persistent at least until the next subsystem reset. A facility may be concurrently added. A facility may or may not be concurrently removed when the last AP of an AP type is deconfigured.

General register 2 is modified as defined when the TAPQ function completes with, e.g., condition code 0 (successful completion); or condition code 3, response codes, e.g., 02-05 (unexpected conditions; e.g., AP queue reset in progress, AP deconfigured, AP checkstop, AP busy). Otherwise general register 2 is not modified.

Although specific fields, locations of fields, sizes of fields, bits and values of fields or bits are described in one embodiment herein for the Process Adjunct Processor Queue instruction and its associated registers, other fields, locations of fields, sizes of fields, bits and/or values of fields or bits may be used without departing from a spirit of one or more aspects of the invention. Fields and/or bits of each of the general registers not described herein may be blank, have a predefined value (e.g., zero), and/or include values to be ignored in one embodiment. Many possibilities exist.

In accordance with one or more aspects, the adjunct processor (e.g., crypto card) has logic that recognizes attributes of different types of commands. These attributes define, in one embodiment, sets and subsets of commands when considered together. The different types of commands are provided, in one embodiment, by a hypervisor. The hypervisor determines, for instance, a set of command type tags based on, e.g., a set of customers from which command requests may be received. For example, the types of commands to be represented by the set of command type tags are based on, e.g., the computing policies (e.g., licensing terms; permissions; resource requirements, such as, e.g., high availability requirements; etc.) of the customers from which command requests are to be received.

In one example, a command has a set of tags (e.g., policy or filtering tags) associated therewith that represents the attributes of the command, and commands that have a same tag may be considered as a group. The same command can appear in multiple command type sets based on the hypervisor imposed set of command type tags. For instance, a command may have a stateless command-type tag to indicate that the command is a valid stateless command-type command, a master-key command-type tag to indicate that the command is a valid master-key command-type command, etc. There are different possibilities of command-types, command-type facilities and command-type commands, and each command may have one or more command-type tags associated therewith.

An indication of the set of command type tags is obtained (e.g., provided, received, retrieved, etc.) by the adjunct processor. The adjunct processor (e.g., adjunct processor firmware) separates expected commands into different sets of commands based on the set of command type tags that can be requested by the hypervisor. For instance, in one particular example, the adjunct processor receives a set of command type tags that includes a tag for secure-key command-type commands (e.g., used to disable secure-key commands when requested by the caller); and a tag for stateless command-type commands. Therefore, the adjunct processor considers commands that use encrypted keys (e.g., secure-key command-type commands) as part of a secure-key command-type command set; and the remainder of the commands are considered part of a stateless command-type command set using the command attributes of each command. In other embodiments in which the hypervisor provides other tags for other filtering facilities, other command sets with commands corresponding to the other tags are provided. Many types of command sets are possible.

Further, in one embodiment, a command request is configured to include one or more filtering indicators, such as one or more command-type filtering indicators, used to provide per-command filtering, in accordance with one or more aspects of the present invention. Further details regarding selected command-type filtering indicators included in a command request are described with reference to FIGS. 3A-3B.

Figure 3A:
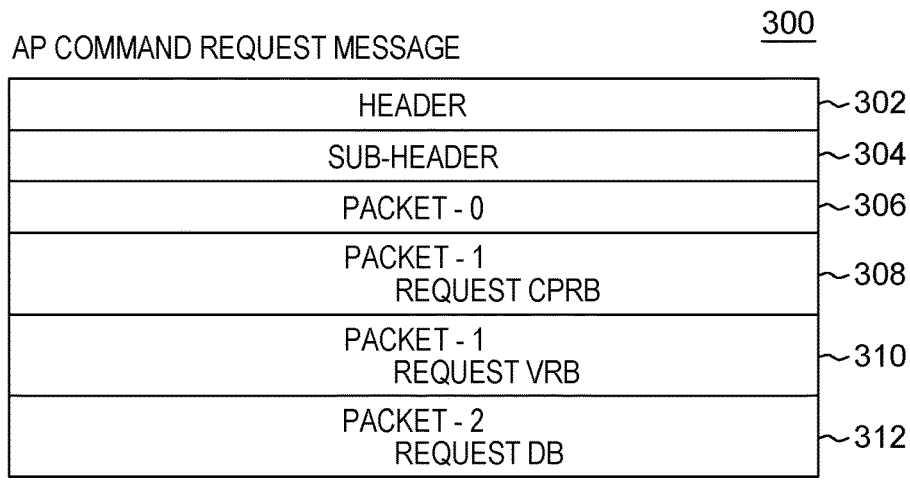
FIG. 3A depicts one example of an Adjunct Processor Command Request Message, in accordance with one or more aspects of the present invention.

Referring to FIG. 3A, in one example, an AP command request message 300 includes a header 302, a sub-header 304, and a plurality of packets 306-312. In one example, one or more of the packets (e.g., one or more of packet-1 308-310) is configured to provide a command and one or more of the packets (e.g., packet-2 312) is configured to provide input data. One of the packets includes a request connectivity programming request block (CPRB) 308 that includes one or more filtering indicators related to command-type filtering, in accordance with an aspect of the present invention.

Figure 3B:
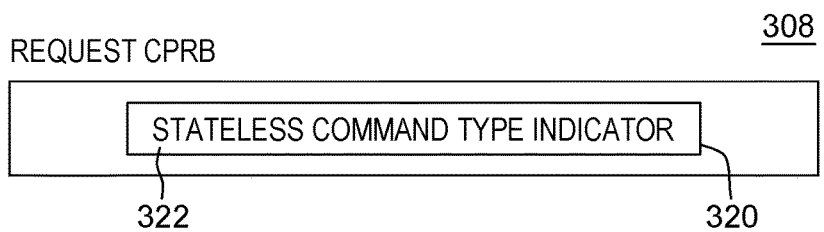
FIG. 3B depicts one example of a Request Connectivity Programming Request Block (CPRB), in accordance with one or more aspects of the present invention.

For instance, as shown in FIG. 3B, request CPRB 308 includes an AP command filter mask 320 that includes one or more command-type filtering indicators. One example of a command-type filtering indicator is a stateless command type indicator 322. This indicator indicates whether the allowed command set is for stateless command-type commands (e.g., indicator 322, such as a selected bit, set to one) or for the full command set (e.g., indicator 322 set to zero). Other indicators, flags, bits, etc., may be included in the request CPRB 308 to indicate other types of commands that may be filtered. For instance, another indicator may indicate filtering based on master keys. Many other examples are possible.

Figure 3C:
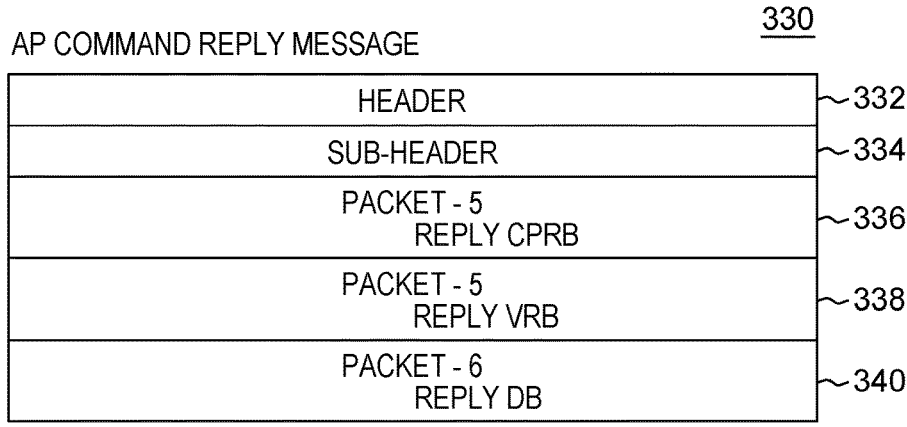
FIG. 3C depicts one example of an Adjunct Processor Command Reply Message, in accordance with one or more aspects of the present invention.

In response to a message, a reply is provided, and in one example, is in the form of an AP command reply message, an example of which is depicted in FIG. 3C. As shown, an AP command reply message 330 includes, for instance, a header 332, a sub-header 334, and a plurality of packets 336-340. One of the packets includes a reply CPRB 336 that includes a reply to the request and may indicate an error, in accordance with an aspect of the present invention.

Figure 3D:
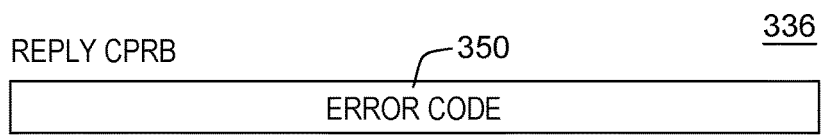
FIG. 3D depicts one example of a Reply Connectivity Programming Request Block (CPRB), in accordance with one or more aspects of the present invention.

For instance, as shown in FIG. 3D, reply CPRB 336 includes an error indication 350. The error indication may include an error code (e.g., CPRB return_code/reason_code) to report that a customer requested command is not allowed by a defined set of command-type tags (e.g., imposed by a hypervisor or another entity).

Figure 3E:
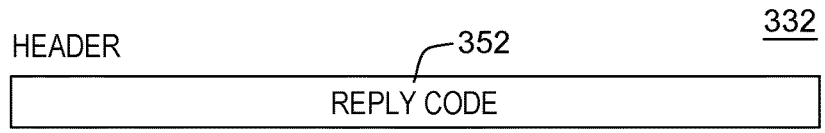
FIG. 3E depicts one example of a field of the header in FIG. 3C, in accordance with one or more aspects of the present invention.

In one example, referring to FIG. 3E, the error code is translated to a selected AP reply code (e.g., 8B Invalid Stateless Command) and stored in header 332 in a reply code field 352. This provides a central location for the error code.

In one embodiment, after an AP command request message enters the in-process state, normal processing of the command request terminates if the stateless AP command filtering facility is installed and an AP command request message sets the stateless command-type bit (e.g., stateless command type indicator 322) to one in the CPRB but does not specify a stateless AP command, or if the stateless AP command filtering facility is not installed but a stateless AP commands facility is installed and an AP command request message does not specify a stateless AP command. As one example, a type-86 command-reply message specifying a format-1 sub-header is returned with reply code 8B.

In one aspect, a command request message is targeted for a particular adjunct processor, referred to herein as a target adjunct processor. Therefore, in accordance with an aspect of the present invention, a determination is made as to whether the target adjunct processor is able to execute the command. For example, if the command request includes a filtering indicator (e.g., a selected command-type filtering indicator, such as stateless command type indicator 322) indicating that the requester is only allowed to execute commands of a particular filtering facility or mode, then a determination is made as to whether the target adjunct processor supports command-type filtering, and in particular, the specific filtering facility indicated by the command. In one example, this is determined via a Process Adjunct Processor Queue instruction or similar type of instruction. If the target adjunct processor does not support the particular command-type filtering mode, then in accordance with an aspect of the present invention, the command is simulated by executing the command on another adjunct processor that supports the particular command-type filtering mode, checking the results, and then executing the command on the target adjunct processor if the results indicate a valid command for the selected command-type filtering mode.

Figure 4A:
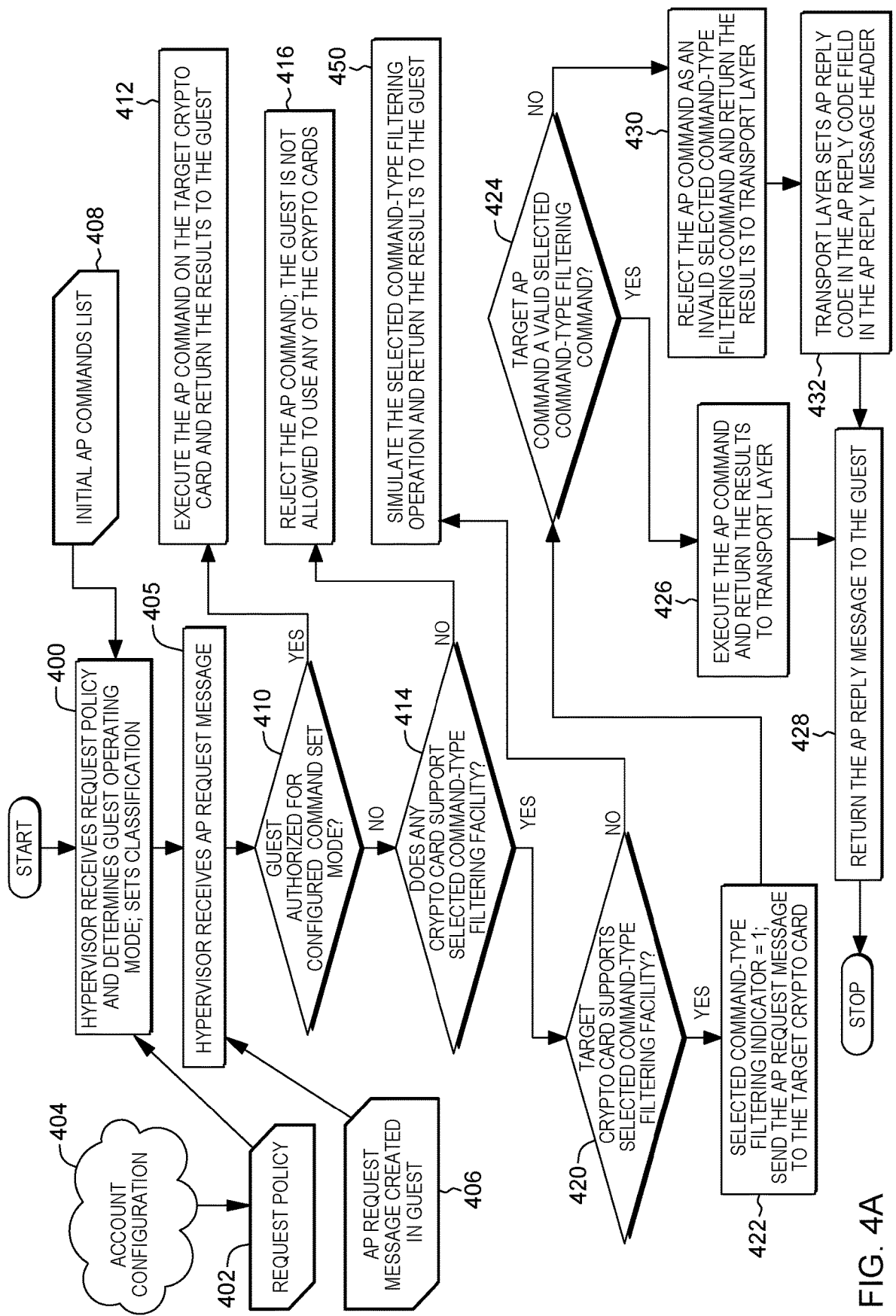
FIG. 4A depicts one example of a command-type filtering process, in accordance with one or more aspects of the present invention.
Figure 4B:
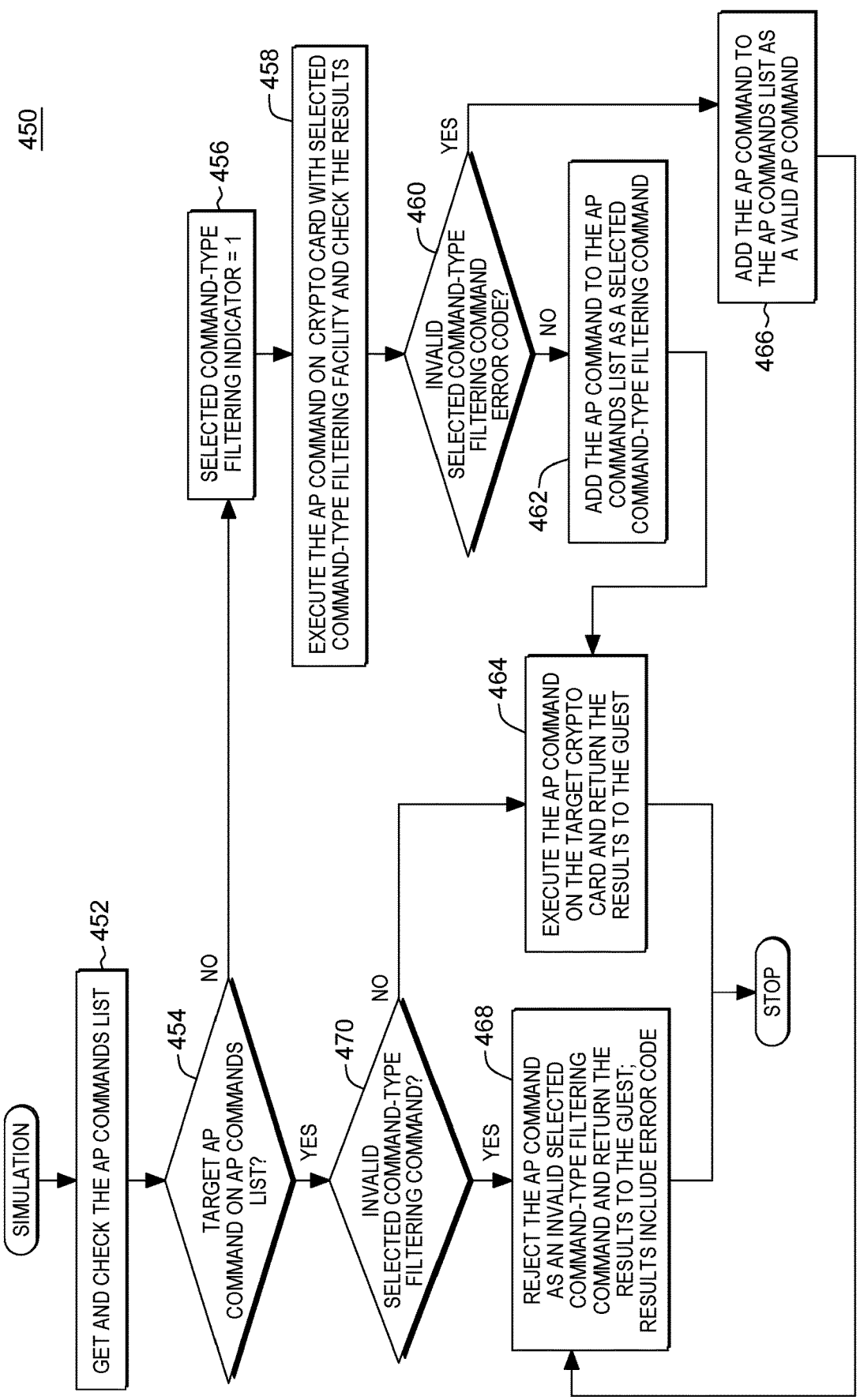
FIG. 4B depicts one example of a flow to simulate command-type filtering, in accordance with one or more aspects of the present invention.

Further details regarding command simulation are described with reference to FIGS. 4A-4B. In the example of FIGS. 4A-4B, the computing environment is a cloud environment; however, in other embodiments, the computing environment is a non-cloud environment. Aspects of the invention are not limited to a particular computing environment. Further, in the example of FIGS. 4A-4B, the adjunct processor is a cryptographic card. However, filtering may be used by other adjunct processors; cryptographic card is only one example.

Referring to FIG. 4A, in one embodiment, a hypervisor (e.g., hypervisor 672 (FIG. 6C); 692 (FIG. 6D), described below) obtains (e.g., receives, is provided, retrieves, has access to, etc.) a request policy 402 (e.g., a cloud request policy) for the guest, which is based on an account configuration 404 (e.g., cloud account configuration), and determines the guest's operating mode, STEP 400. Request policy 402 includes, for instance, an indication for each requester (e.g., guest; caller; customer) permissible command types to be processed for the requester based on the requester's computing policy (e.g., license terms; resource requirements, such as high availability requirements; and/or permissions; etc.) provided by account configuration 404. Based on the request policy, the hypervisor sets at least one indication (e.g., at least one bit) in classification 236 to indicate the capabilities of the guest for the configuration. For instance, if the guest is allowed, based on the request policy, to access the full AP command set, then bit 8 is set to one and bit 9 is set to zero; however, if the guest is only allowed to access a selected subset of commands, such as stateless command-type commands, then bit 8 is set to zero and bit 9 is set to one. Other bits would be used for other types of facilities. The setting of the bits applies to all of the adjunct processors of the configuration indicating the guest's operating mode for the configuration. As examples, the setting of classification 236 is performed at an initial program load (IPL) of the guest, based on receiving the request, or at another time for one or more guests to reflect the operating mode of each guest and saved (e.g., a classification for each guest). Other embodiments are possible.

Additionally, the hypervisor obtains (e.g., receives, is provided, retrieves, has access to, etc.) an initial adjunct processor commands list 408 to be used in the simulation process, as described herein. As an example, the hypervisor dynamically generates an AP commands list based on information obtained from a cryptographic card that does support the selected command-type filtering facility (e.g., stateless AP command filtering facility) and uses the commands list in simulating, e.g., the stateless AP command filtering operation on the target cryptographic card that does not support the selected command-type filtering facility, as described below. In one example, it initializes the AP commands list with default values, such as all zeros (an empty list) or a list of known stateless AP commands with a stateless AP command indicator (or commands of other facilities).

Further, the hypervisor obtains (e.g., receives, is provided, retrieves, has access to, etc.) an AP command request message 406 (e.g., message 300) from a guest, STEP 405. As an example, the hypervisor intercepts the AP command from the guest before the AP command is enqueued into the target AP queue, based on the guest program enqueuing the AP command into the target AP queue via an enqueue instruction, such as an NQAP (Enqueue Adjunct Processor Queue) instruction of the z/Architecture hardware architecture, or another enqueue instruction of another architecture.

The hypervisor determines whether the guest is authorized for the configured command set mode of the adjunct processor (e.g., co-processor-full set of commands), INQUIRY 410. As an example, the hypervisor determines whether the guest has access to the full set of commands (e.g., co-processor mode) or a reduced set of commands (e.g., stateless command filtering mode) by checking classification 236, which is based on request policy 402 (which is based on the guest's computing policy). If the guest is authorized for the configured command set mode, then the hypervisor sends the AP command to the target adjunct processor, the AP command is executed on the target adjunct processor (e.g., the crypto card) and the results are returned to the guest, STEP 412.

However, if the guest is not authorized for the configured command set mode, INQUIRY 410, but instead, is authorized for a selected mode, such as a stateless command filtering mode, then a further determination is made by, e.g., the hypervisor as to whether there is a cryptographic card in the machine configuration that supports the selected command-type filtering facility, INQUIRY 414. For instance, a determination is made as to whether the stateless command filtering facility is supported by any of the cryptographic cards. This may be determined, for instance, by executing the Process Adjunct Processor Queue instruction for each cryptographic card. If it is determined that there is not a cryptographic card that supports the selected command-type filtering facility, then the hypervisor rejects the AP command, since the guest is not allowed to use any of the cryptographic cards, STEP 416.

Returning to INQUIRY 414, if there is, however, at least one cryptographic card that supports the selected command-type filtering facility, then a further determination is made by, e.g., the hypervisor as to whether the target cryptographic card supports the selected command-type filtering facility, INQUIRY 420. If the target cryptographic card supports the selected command-type filtering facility, as indicated by the Process Adjunct Processor Queue instruction, then the hypervisor sets a filtering indicator, such as a selected command-type filtering indicator, in the command request to a select value (e.g., 1), and sends the command to the target cryptographic card for processing, STEP 422. For instance, stateless command type indicator 322 in request CPRB 308 is set to one, and then, the request is sent to the target cryptographic card for processing.

The target cryptographic card obtains (e.g., receives, is provided, retrieves, etc.) the command request message and determines whether the command is a valid command for the selected command-type filtering mode, INQUIRY 424. For instance, is the command part of the set of commands of the selected command-type filtering facility? If the command is part of the set of commands of the selected command-type filtering facility, then the command is executed by the target cryptographic card and the results are placed in a command reply message of the cryptographic card, which is sent, for instance, to the AP transport layer, STEP 426. The transport layer translates the command reply message received from the cryptographic card into an AP command reply message (e.g., message 330), which is returned to the guest, STEP 428.

Returning to INQUIRY 424, if the command is not a valid selected command-type filtering command (e.g., it is not in the set of commands of the selected command-type filtering facility), then the command is rejected by the target cryptographic card as an invalid selected command-type filtering command and such an indication is returned to the transport layer, STEP 430. For instance, a selected error code (e.g., error code 350) is included in a reply CPRB of the cryptographic card's reply message and the reply message is sent to the transport layer, as an example. The transport layer translates the reply message received from the cryptographic card, providing AP command reply message 330, which includes error code 350 of reply CPRB 336, as well as a reply code 352 in header 332. For instance, the transport layer translates the selected error code in the CPRB into an AP reply code (e.g., 8B) and places it in an AP reply code field of the AP reply message header (e.g., reply code 352) to facilitate access of the reply code, STEP 432. The reply message is sent to the guest, STEP 428.

Returning to INQUIRY 420, if the target cryptographic card does not support the selected command-type filtering facility (e.g., the stateless command filtering facility), then, in accordance with an aspect of the present invention, the hypervisor simulates the selected command-type filtering operation (e.g., the stateless command filtering operation), as described below, and results of the operation are returned to the guest, STEP 450. Further details of simulating a selected command-type filtering operation are described with reference to FIG. 4B.

Referring to FIG. 4B, in one embodiment, the hypervisor checks an AP commands list (e.g., AP commands list 408) for the requested command, STEP 452. For instance, the hypervisor checks the AP commands list to see if the target AP command is included in the AP commands list. If the requested command is not on the list, INQUIRY 454, the appropriate filtering indicator (e.g., a selected command-type filtering indicator, such as a stateless command type indicator 322) is set to a select value, e.g., one, STEP 456, and the command is sent to one of the cryptographic cards that supports the selected command-type filtering facility.

The cryptographic card processes the command, and the hypervisor checks the results, STEP 458. If the results indicate a valid command for the selected command-type filtering facility, INQUIRY 460, the hypervisor adds the AP command to the AP commands list as a selected command-type filtering command (e.g., as a stateless AP command-type command), STEP 462. Moreover, the AP command is executed on the target cryptographic card and the results are returned to the guest, STEP 464.

Returning to INQUIRY 460, if the results indicate, via e.g., an error code, an invalid command for the selected command-type filtering facility, the hypervisor adds the command to the command list as a valid AP command (but not as a valid selected command-type filtering command), STEP 466, and the AP command is rejected, STEP 468. For instance, the hypervisor rejects the AP command as an invalid selected command-type filtering command by composing an invalid stateless AP command error reply message with the new AP reply code 8B in the AP reply code field (e.g., reply code 352) of the AP command reply message header (e.g., header 332) and returning the composed AP reply message to its guest that enqueued the AP command to indicate to the guest that the command is not a selected AP command-type command.

Returning to INQUIRY 454, if the AP command is on the AP commands list, then a further determination is made by, e.g., the hypervisor as to whether the command is a valid command for the selected command-type filtering facility, INQUIRY 470. If the command is valid for the selected command-type filtering facility, then processing continues to STEP 464 in which the AP command is sent by the hypervisor to the target cryptographic card, the command is executed on the target cryptographic card and the results are returned to the guest. However, if the AP command is invalid for the selected command-type filtering facility, then the AP command is rejected by the hypervisor as an invalid command for the selected command-type filtering facility and the results are returned to the guest, STEP 468, as described above.

In one embodiment, when the guest program dequeues the AP command reply message (e.g., message 330) from the AP queue via, for instance, a dequeue instruction, such as the Dequeue Adjunct Process Queue (DQAP) instruction of the z/Architecture hardware architecture or an instruction of another architecture, it receives the processed AP command reply message from the cryptographic card (either from the hypervisor simulation or the crypto card). The guest program sees the same error code, e.g., code 8B, in the AP reply code (e.g., reply code 352) regardless of whether the AP command was rejected by the hypervisor simulation or the crypto card. However, in one embodiment, the guest program would only see the error code in the CPRB of the command reply message if the cryptographic card processed the AP command and not the hypervisor simulation. Therefore, the CPRB error code can be used to determine the generator of the error by inspecting the AP command reply message.

As described herein, in one embodiment, if the guest is allowed to execute only a subset of commands (e.g., stateless command-type commands) but none of the cryptographic cards in the hypervisor's configuration supports the selected mode (e.g., stateless AP command filtering), then the hypervisor does not simulate the stateless AP command filtering facility on its own and does not allow the guest to use the cryptographic cards.

However, in accordance with an aspect of the present invention, if the guest is running in a selected command-type filtering mode (e.g., stateless AP command filtering mode) but the selected command-type filtering facility is not installed on the target cryptographic card, then the hypervisor checks to see if the AP command is a command of the selected command-type filtering facility by simulating the command. This is performed, in one example, instead of keeping a static list of selected commands for each cryptographic card type it supports, which is quite burdensome and not easy to obtain in time for machine bring-up testing. It uses the information from one of the other cryptographic cards that does support the selected command-type mode to simulate the command on the target cryptographic card that does not support the selected command-type mode facility. The AP command reply message is composed by the hypervisor and the results are sent to the guest.

If the guest is running in the selected command-type mode and the selected AP command-type filtering facility corresponding to the selected command-type mode is installed on the target cryptographic card, then the hypervisor sets the stateless command type indicator in the CPRB and sends the command to the target cryptographic card to be executed.

In one embodiment, the cryptographic card receives a command request message (e.g., AP command request message 300) from the hypervisor, determines if the command is allowed to be executed based on the hypervisor imposed set of command-type filtering indicators in the CPRB, executes the command if the command is determined to be valid based on the hypervisor imposed set of command-type indicators, and the results are placed in a command reply message. The command reply message is sent, e.g., to the AP command transport layer (e.g., transport layer 110, 160), and the AP command transport layer translates the command reply message into AP command reply message 330. Further, it translates the filtering error code (if found) in the CPRB into a selected AP reply code, e.g., 8B. The transport layer places the reply code in the AP reply code field (e.g., reply code 352) in the AP command reply message header (e.g., header 332) and sends the results to the guest.

In accordance with an aspect of the present invention, an error code (e.g., invalid stateless AP command error code) is defined in the error reporting field in the reply CPRB of the AP command reply message for the crypto card to report that a guest requested an AP command that is not allowed by the hypervisor imposed set of command-type filtering indicators. The crypto card reports the AP command-type filtering error code in the error reporting field in the reply CPRB of the AP command reply message. However, the cryptographic card error code in the CPRB is located at different offsets for different modes (e.g., co-processor mode, EP11 mode) and their message structures and formats are different. Therefore, a central place to return the AP error code (e.g., the AP reply code) that is independent of adjunct processor modes is provided to easily locate the error code by the hypervisor(s), as well as the guest(s), regardless of who generates the error. As a result, an invalid select mode error code (e.g., AP reply code 8B) is defined in the AP reply code field (e.g., reply code 352) of the AP command reply message header to report the filtered non-stateless AP command error. The AP reply code is the common error reporting field for an AP message because it facilitates the guest locating the error code regardless of who generates the error (hypervisor using command-type filtering simulation, cryptographic card in co-processor mode, cryptographic card in XCP mode, or cryptographic card in accelerator mode, etc.). However, the cryptographic card does not have access to the AP reply code field, and therefore, does not store the AP reply code into the AP reply code in the AP command reply message header. The cryptographic card error codes that are stored in the error reporting field in the reply CPRB of the AP command reply message are generally outside the scope of AP architecture. Therefore, the transport layer is configured to look for the select command-type filtering mode error code in the error reporting field in the reply CPRB of the AP command reply message and to translate the error code in the CPRB in to the reply code, e.g., 8B, and place it in the AP reply code.

Having the invalid select mode command error code in the error reporting field in the reply CPRB of the AP command reply message is useful for debugging purposes to determine if the AP reply code was generated by the cryptographic card or the hypervisor simulation since the hypervisor simulation does not store the invalid select mode command error code in the error reporting field in the reply CPRB of the AP command reply message.

One or more aspects of the present invention are inextricably tied to computer technology and facilitate processing, including command processing, within a computing environment, improving performance thereof. Further details of one embodiment of aspects related to facilitating processing within a computing environment are described with reference to FIGS. 5A-5B.

Referring to FIG. 5A, in one embodiment, a determination is made as to whether a target adjunct processor of a plurality of adjunct processors of the computing environment is configured to support a selected command-type filtering mode (500), and a check is made as to whether another adjunct processor of the plurality of adjunct processors is configured to support the selected command-type filtering mode (502).

Based on determining that the target adjunct processor is not configured to support the selected command-type filtering mode and based on the other adjunct processor being configured to support the selected command-type filtering mode, a command is forwarded to the other adjunct processor for processing to determine whether the command is valid for the selected command-type filtering mode (504). An indication is obtained of whether the command is valid for the selected command-type filtering mode, based on processing at the other adjunct processor (506).

The command is sent to the target adjunct processor for execution, based on obtaining an indication that the command is valid for the selected command-type filtering mode (508).

In one embodiment, the command is rejected as invalid for the selected command-type filtering mode and it is refrained from executing on the target adjunct processor, based on obtaining an indication that the command is invalid for the selected command-type filtering mode (510).

Additionally, in one example, an error code is placed in a central location to facilitate access to the error code (512).

As examples, the selected command-type filtering mode is a stateless command filtering mode (514), and the plurality of adjunct processors includes a plurality of cryptographic cards (516).

Referring to FIG. 5B, in one embodiment, the command is added to a command list as a selected command-type filtering mode command, based on obtaining an indication that the command is valid for the selected command-type filtering mode (518). The command list is to be used to determine which commands are valid for execution on the target adjunct processor (520). Further, in one embodiment, the command is added to the command list as a valid adjunct processor command, based on obtaining an indication that the command is invalid for the selected command-type filtering mode (522).

In one embodiment, the command is rejected based on determining that the plurality of adjunct processors is not configured to support the selected command-type filtering mode (524).

Further, in one embodiment, based on determining that the target adjunct processor is not configured to support the selected command-type filtering mode and based on the other adjunct processor being configured to support the selected command-type filtering mode, a determination is made as to whether the command is on a command list, the command list to be used to determine whether the command is to be executed on the target adjunct processor (526). Based on determining that the command is not on the command list, the command is forwarded to the other adjunct processor for processing (528).

In one embodiment, the command is added to the command list as a valid selected command-type filtering mode command, based on successful execution of the command on the other adjunct processor (530). Moreover, the command is added to the command list as a valid adjunct processor command, based on unsuccessful execution of the command on the other adjunct processor (532).

Other variations and embodiments are possible.

Command-type filtering of one or more aspects of the present invention may be incorporated and used in many computing environments. One example computing environment is described with reference to FIG. 6A. As an example, the computing environment is based on the z/Architecture® hardware architecture, offered by International Business Machines Corporation, Armonk, New York. The z/Architecture hardware architecture, however, is only one example architecture. The computing environment may also be based on other architectures, including, but not limited to, the Intel x86 architectures, other architectures of International Business Machines Corporation, and/or architectures of other companies.

Figure 6A:
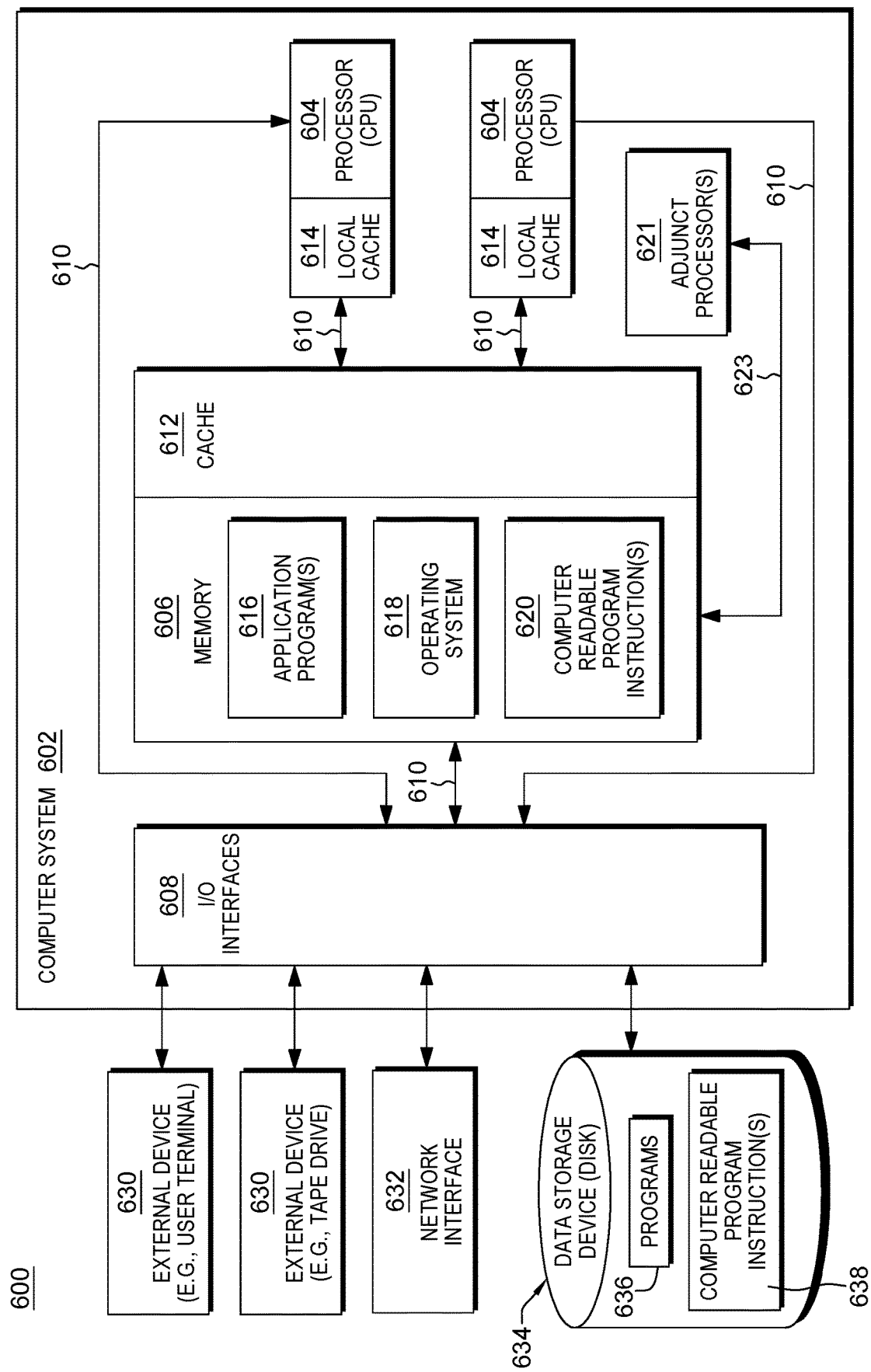
FIG. 6A depicts one example of a computing environment to incorporate and use one or more aspects of the present invention.

As shown in FIG. 6A, a computing environment 600 includes, for instance, a computer system 602 shown, e.g., in the form of a general-purpose computing device. Computer system 602 may include, but is not limited to, one or more processors or processing units 604 (e.g., central processing units (CPUs)), a memory 606 (a.k.a., system memory, main memory, main storage, central storage or storage, as examples), and one or more input/output (I/O) interfaces 608, coupled to one another via one or more buses and/or other connections 610.

Bus 610 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 606 may include, for instance, a cache 612, such as a shared cache, which may be coupled to local caches 614 of processors 604. Further, memory 606 may include one or more programs or applications 616, at least one operating system 618, and one or more computer readable program instructions 620. Computer readable program instructions 620 may be configured to carry out functions of embodiments of aspects of the invention.

In one embodiment, memory 606 (e.g., at least a hardware system area of memory 606) is coupled to one or more adjunct processors 621 via one or more adjunct processor buses 623 and in one or more embodiments, via an AP transport layer.

Computer system 602 may communicate via, e.g., I/O interfaces 608 with one or more external devices 630, such as a user terminal, a tape drive, a pointing device, a display, and one or more data storage devices 634, etc. A data storage device 634 may store one or more programs 636, one or more computer readable program instructions 638, and/or data, etc. The computer readable program instructions may be configured to carry out functions of embodiments of aspects of the invention.

Computer system 602 may also communicate via, e.g., I/O interfaces 608 with network interface 632, which enables computer system 602 to communicate with one or more networks, such as a local area network (LAN), a general wide area network (WAN), and/or a public network (e.g., the Internet), providing communication with other computing devices or systems.

Computer system 602 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 602. Examples, include, but are not limited to: microcode, device drivers, redundant processing units, external disk drive arrays, RAID systems, tape drives, and data archival storage systems, etc.

Computer system 602 may be operational with numerous other general-purpose or special purpose computing system environments or configurations. Examples of well-known computing systems, environments, and/or configurations that may be suitable for use with computer system 602 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6B:
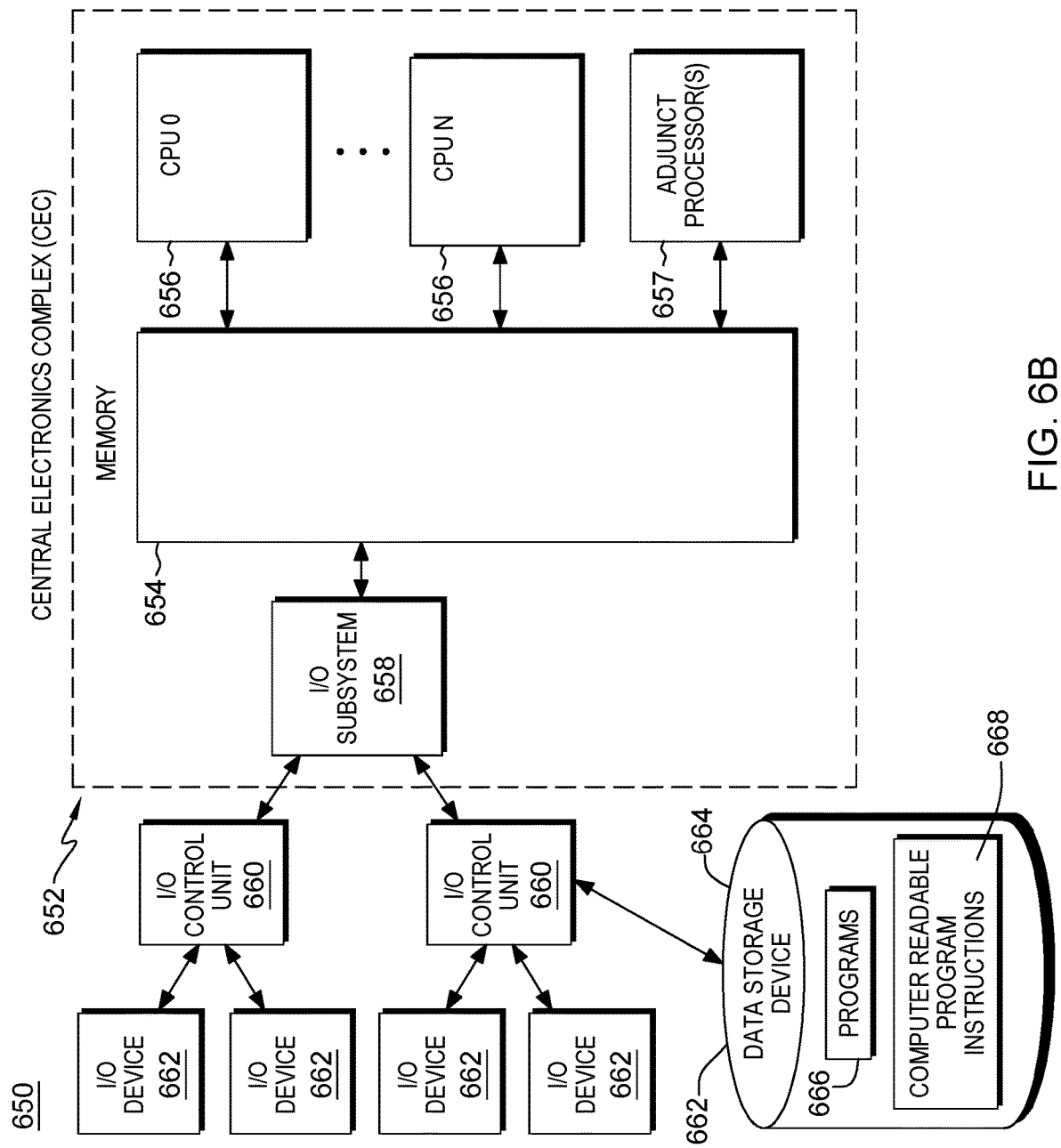
FIG. 6B depicts another example of a computing environment to incorporate and use one or more aspects of the present invention.

Another example of a computing environment to incorporate and use one or more aspects of the present invention is described below with reference to FIG. 6B. As an example, the computing environment of FIG. 6B can be based on the z/Architecture® hardware architecture offered by International Business Machines Corporation. The z/Architecture hardware architecture, however, is only one example architecture. Again, the computing environment may also be based on other architectures, including, but not limited to, the Intel x86 architectures, other architectures of International Business Machines Corporation, and/or architectures of other companies.

In one example, a computing environment 650 includes a central electronics complex (CEC) 652. CEC 652 includes a plurality of components, such as, for instance, a memory 654 (a.k.a., system memory, main memory, main storage, central storage, storage) coupled to one or more processors (a.k.a., central processing units (CPUs)) 656 and to an input/output (I/O) subsystem 658. Further, in one embodiment, memory 654 (e.g., at least a hardware system area of memory 654) is coupled to one or more adjunct processors 657 via one or more adjunct processor buses and in one or more embodiments, via an AP transport layer.

I/O subsystem 658 can be a part of the central electronics complex or separate therefrom. It directs the flow of information between main storage 654 and input/output control units 660 and input/output (I/O) devices 662 coupled to the central electronics complex.

Many types of I/O devices may be used. One particular type is a data storage device 664. Data storage device 664 can store one or more programs 666, one or more computer readable program instructions 668, and/or data, etc. The computer readable program instructions can be configured to carry out functions of embodiments of aspects of the invention.

Central electronics complex 652 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 652. Examples include, but are not limited to: microcode, device drivers, redundant processing units, external disk drive arrays, RAID systems, tape drives, and data archival storage systems, etc.

Further, central electronics complex 652 can be operational with numerous other general-purpose or special-purpose computing system environments or configurations. Examples of well-known computing systems, environments, and/or configurations that may be suitable for use with central electronics complex 652 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 6D:
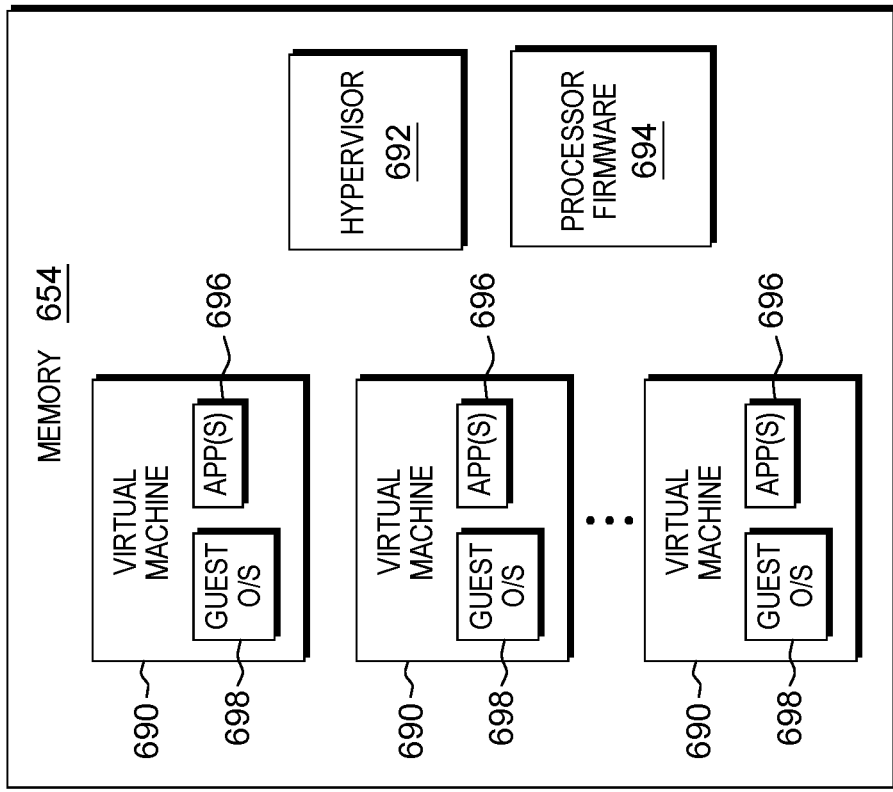
FIG. 6D depicts another example of further details of a memory of FIG. 6B, in accordance with one or more aspects of the present invention.
Figure 6C:
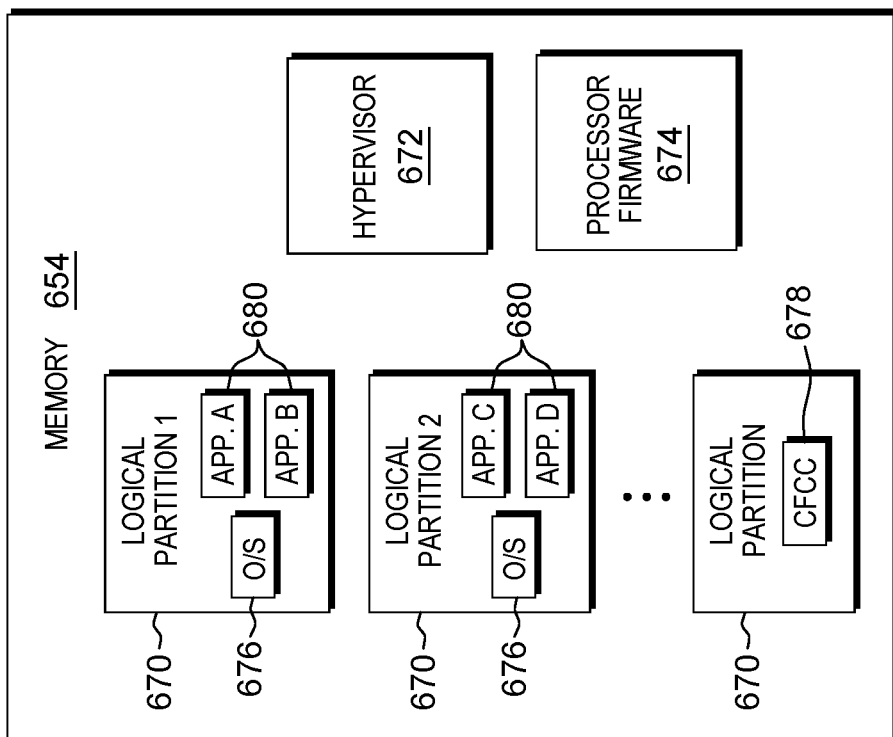
FIG. 6C depicts one example of further details of a memory of FIG. 6B, in accordance with one or more aspects of the present invention.

Central electronics complex 652 provides in one or more embodiments logical partitioning and/or virtualization support. In one embodiment, as shown in FIG. 6C, memory 654 includes, for example, one or more logical partitions 670, a hypervisor 672 that manages the logical partitions, and processor firmware 674. One example of hypervisor 672 is the Processor Resource/System Manager (PR/SM), offered by International Business Machines Corporation, Armonk, New York. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

Each logical partition 670 is capable of functioning as a separate system. That is, each logical partition can be independently reset, run a guest operating system 676 such as the z/OS® operating system, offered by International Business Machines Corporation, Armonk, New York, or other control code 678, such as coupling facility control code (CFCC), and operate with different programs 680. An operating system or application program running in a logical partition appears to have access to a full and complete system, but in reality, only a portion of it is available. Although z/OS is offered as an example, other operating systems may be used in accordance with one or more aspects of the present invention.

Memory 654 is coupled to CPUs 656 (FIG. 6B), which are physical processor resources that can be allocated to the logical partitions. For instance, a logical partition 670 includes one or more logical processors, each of which represents all or a share of a physical processor resource 656 that can be dynamically allocated to the logical partition.

In yet a further embodiment, the central electronics complex provides virtual machine support (either with or without logical partitioning support). As shown in FIG. 6D, memory 654 of central electronics complex 652 includes, for example, one or more virtual machines 690, a virtual machine manager, such as a hypervisor 692, that manages the virtual machines, and processor firmware 694. One example of hypervisor 692 is the z/VM® hypervisor, offered by International Business Machines Corporation, Armonk, New York. The hypervisor is sometimes referred to as a host. z/OS and z/VM are trademarks or registered trademarks of International Business Machines Corporation in at least one jurisdiction.

The virtual machine support of the CPC provides the ability to operate large numbers of virtual machines 690, each capable of operating with different programs 696 and running a guest operating system 698, such as the Linux® operating system. Each virtual machine 690 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 7A:
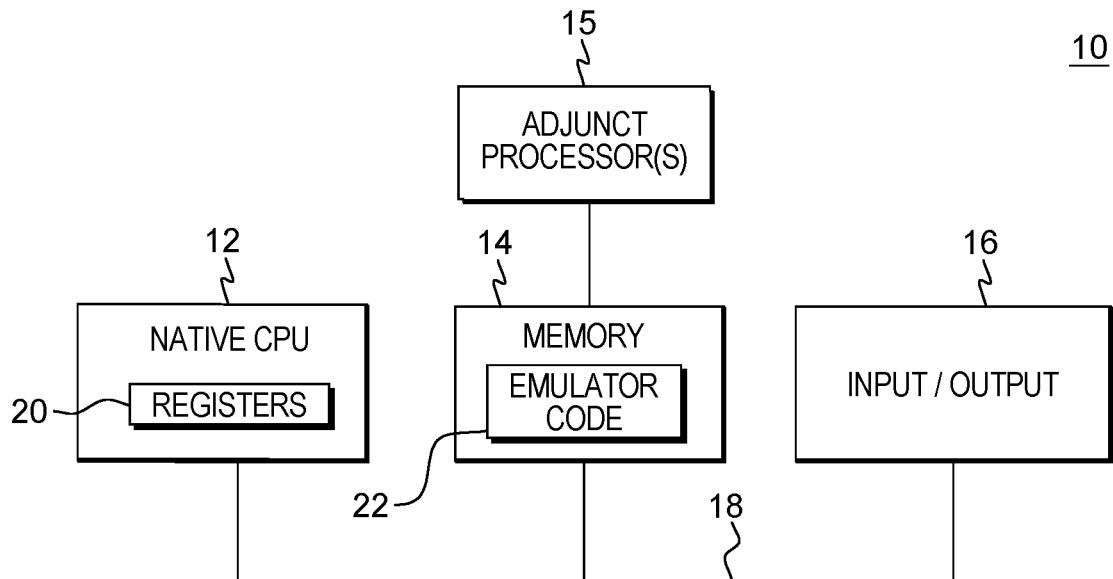
FIG. 7A depicts another example of a computing environment to incorporate and use one or more aspects of the present invention.

Another embodiment of a computing environment to incorporate and use one or more aspects of the present invention is described with reference to FIG. 7A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include a PowerPC® processor offered by International Business Machines Corporation, Armonk, New York; an HP Superdome with Intel Itanium II processors offered by Hewlett Packard Co., Palo Alto, California; and/or other machines based on architectures offered by International Business Machines Corporation, Hewlett Packard, Intel Corporation, Oracle, or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 7B:
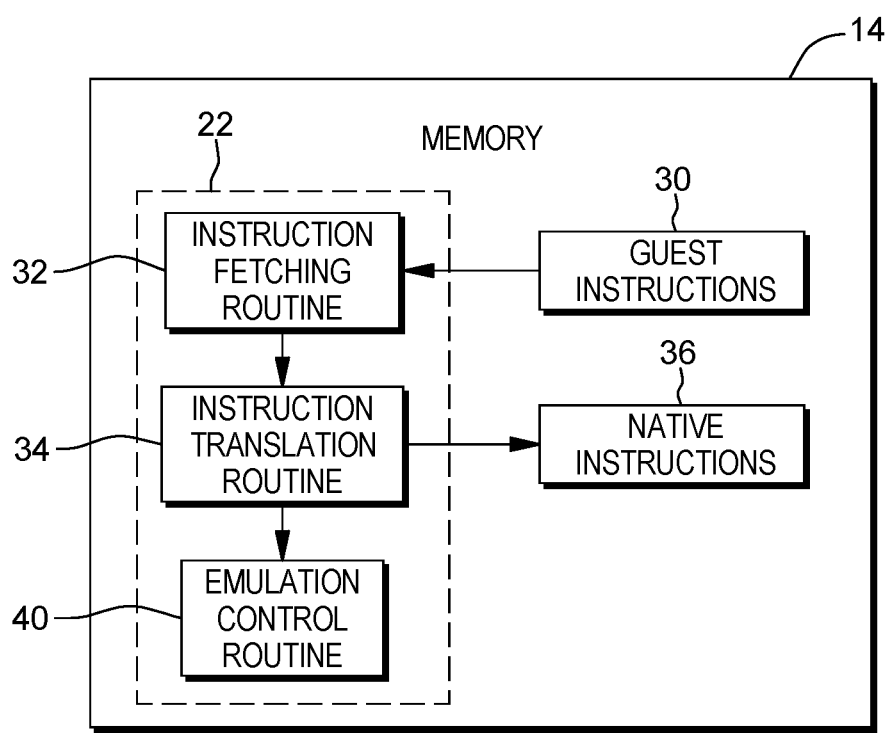
FIG. 7B depicts further details of the memory of FIG. 7A, in accordance with one or more aspects of the present invention.

Further details relating to emulator code 22 are described with reference to FIG. 7B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture hardware architecture, but instead, are being emulated on native CPU 12, which may be, for example, an Intel Itanium II processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

Further, in one embodiment, computing environment 10 includes one or more adjunct processors 15 coupled to memory 14. The one or more adjunct processors are defined in one architecture and are configured to emulate another architecture. For example, an adjunct processor obtains guest commands of the architecture being emulated, translates the guest commands into native commands of the one architecture and executes the native commands.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured for per command-type filtering, in accordance with one or more aspects of the present invention.

As described herein, in one or more aspects, command-type filtering on a per command basis is provided. Many filtering techniques may be used. In one particular example, stateless command filtering is provided. With this filtering, in one example, if the stateless command filtering facility is set to, e.g., zero, then the stateless command filtering facility is not installed and the adjunct processor (e.g., crypto card) allows the commands that are supported by the adjunct processor to be executed; otherwise, the stateless command filtering facility is installed and whether a command is executed by the adjunct processor is dependent on the value of the hypervisor imposed set of command-type filtering indicator(s) in a command request. An example embodiment that includes a stateless command type indicator in the command request message is described below:

If the stateless command type indicator (e.g., indicator 322) is set to zero in the command request message (e.g., message 300), the crypto card allows all the commands that are supported by the crypto card to be executed. If the stateless command type indicator (e.g., indicator 322) is set to one in the command request message (e.g., message 300), the crypto card does not allow all the commands that are supported by the crypto card to be executed. If the command in the command request message is a stateless command-type command, then the command is executed. If the command in the command request message is not a stateless command-type command, then the command is rejected with an error code in the CPRB (e.g., reply CPRB 336) of the command reply message (e.g., message 330).

In one or more aspects, the configured mode of the cryptographic card (e.g., co-processor mode) can be used to either provide the stateless command filtering (also referred to as a non-secure-key filtering mode; e.g., only stateless command-type commands are processed) or another filtering mode with a reduced set of commands without configuring the cryptographic card in a new crypto card mode, like, e.g., the accelerator mode. The filtering technique may be used to filter a set of commands, such as stateless command-type commands or other command-type commands in other examples, such as master key management commands, etc. This reduces the number of adjunct processors to be purchased and managed.

Furthermore, one or more aspects of the invention provide the capability to switch the command-type filtering mode dynamically for each command; the command-type filtering is done on a per command basis. Therefore, each command may be either valid or invalid at command processing time based on the command type flags values (e.g., command-type filtering indicators). The program does not have to switch between various crypto card modes to execute different filtering command sets. Therefore, the complexity of managing and using the number of crypto cards remains the same regardless of the number of supported filtering modes. The reduction in program complexity also adds to more efficient code and improves code execution time and performance.

In a further aspect, information is used from an adjunct processor (e.g., a newer version) that supports a selected command-type filtering facility to simulate the filtering facility that the target adjunct processor (e.g., older version) does not support.

In one or more aspects, the hypervisor determines the set of AP command-type filtering modes, AP command-type sets, and AP command-type flags based on the needs of the guest (e.g., cloud environment customers' set). The hypervisor sets the AP command set mode based on the AP command sets that are allowed by the cloud environment guest and enforces that mode of operation by intercepting the AP command issued by the guest and taking appropriate action. The hypervisor provides AP command set filtering mode support to its cloud environment customer by using the corresponding hardware's AP command set filtering mode facility on the crypto cards configured in the guest configuration. The hypervisor does not allow the guest to use the crypto cards if the guest is allowed to execute, e.g., only the stateless subset of AP commands, but none of the crypto cards in the hypervisor's configuration supports the stateless AP command-type filtering (hardware) facility. However, if at least one crypto card supports the stateless command filtering, then the hypervisor simulates, for instance, the stateless AP command-type filtering operation on its own if the guest is running in the stateless AP commands mode but the stateless AP command-type filtering (hardware) facility is not installed on the target cryptographic card.

The hypervisor simulation guarantees, e.g., a functionally equivalent hardware filtering operation by using the information from one of the cryptographic cards that does support the stateless AP command-type filtering (hardware) facility (or other filtering facilities) to simulate the stateless AP command-type filtering operation on the target cryptographic card that does not support the stateless AP command-type filtering (hardware) facility. In one embodiment, the AP command transport layer (e.g., i390CO) is enhanced to provide a way to make a uniform failure response regardless of the originator of the error and to allow software implementation within the hypervisor to be consistent with the cryptographic card.

In one or more aspects, the same cryptographic card mode (e.g., co-processor or EP11 mode) may be used to provide a full AP command set mode, a stateless AP commands mode, or another filtering mode with a reduced set of commands without configuring the cryptographic card in another crypto card mode, like, e.g., the accelerator mode. The customer does not need to purchase additional cards for the crypto card filtering modes. The hypervisor can serve different guests with different AP command-type filtering requirements by, e.g., dedicating different crypto domains of the same crypto card mode to different guests with different AP command-type filtering requirements. The hypervisor can turn non-crypto card type configurations into symmetric crypto card type configurations using a combination of software simulation and hardware filtering capabilities to support its guests. Using a combination of hardware and software filtering using a common interface is useful for multiple crypto card type configurations, in which one or more crypto card types do not provide any hardware filtering facility or not all the supported hardware filtering facilities (e.g., non-symmetric crypto card types).

In one aspect, the hypervisor does not need to maintain a static list of AP commands of each filtering mode for each crypto card type it supports for simulation. Maintaining an up-to-date static list of AP commands of each filtering mode for each crypto card type and mode the hypervisor supports is burdensome and not easy to obtain in time for machine bring-up testing. As a result, the hypervisor cannot guarantee that the software AP command-type filtering will be functionally equivalent to hardware AP command-type filtering by maintaining a static list of AP commands of each filtering mode for each crypto card type it supports.

In one aspect, the program does not have to switch between various crypto card modes to execute different filtering command sets. Therefore, the complexity of managing and using the crypto card remains the same regardless of the number of supported filtering modes. This reduction in program complexity also adds to more efficient code and improves code execution time and performance. Further, in one aspect, the hypervisor does not need to check the proper setting of the command type flags in the CPRB provided by the guest program. It inserts the command type flags in the CPRB of the AP command request message based on the AP command sets that are allowed by the guest, instead of the guest program which generates the AP command request message. As a result, the hypervisor does not need to set (nor reset) the command type flags in the CPRB or reject the command if the command setting violates the command type filtering settings that are allowed by the guest.

In one aspect of using both the hardware and software filtering techniques, using a common interface is useful for multiple crypto card type configurations where one or more crypto card types do not provide any hardware filtering facility or not all the supported hardware filtering facilities (e.g., non-symmetric crypto card types). For example, if the hypervisor configuration is made of a single machine with multiple crypto card types but not all the crypto card types support a selected command-type filtering facility, e.g., the stateless command filtering facility, then the hypervisor can simulate the selected command-type filtering facility on its own on the crypto card types that do not support the selected command-type filtering facility to provide the same selected command-type filtering facility on all the available crypto cards. Similarly, if the hypervisor configuration is made up of multiple machines with different models and the guest can be relocated on any one of those machine models but not all models support, e.g., the selected command-type filtering facility, then the hypervisor can simulate the stateless command filtering facility on its own on the machine models that do not support the selected command-type filtering facility to provide the same selected command-type filtering facility on all the available machine models. This allows the hypervisor to turn non-symmetric crypto card type configurations into symmetric crypto card type configurations using a combination of software and hardware capabilities and provide command-type filtering facility support for its guests. This technique can also be used to support multiple hardware filtering facilities. Other variations are also possible.

Furthermore, the hardware filtering facility provides, for instance, the capability to switch filtering modes dynamically for each command; the command-type filtering is done on a per command basis. As a result, each command may be either valid or invalid at command processing time based on the command type flags values. Therefore, this technique allows the hypervisor to share the same crypto domain with multiple guests with different AP command-type filtering requirements. Also, the program does not have to switch between various crypto card modes to execute different filtering command sets. Therefore, the complexity of managing and using the number of crypto cards remains the same regardless of the number of supported filtering modes. This reduction in program complexity also adds to more efficient code and improves code execution time and performance.

In one or more embodiments, the hypervisor can be a host, like a logical partition hypervisor, an operating system like z/VM® or a device driver. z/VM can serve multiple guests with different policies using the same crypto card. The crypto device driver may be used instead of an operating system in certain environments like a Linux environment, to retrieve the processed AP messages. The crypto device driver can serve multiple users, like a docker container or different applications with different policies. Either a manager, such as a z/VM manager, or a crypto device driver can switch from one filtering mode, such as one command-type filtering mode, to another per command basis. In one example, if at least one guest executes only a single crypto command, the manager or the crypto device driver switches to the next guest and the next guest executes its crypto command from a different filtering mode.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
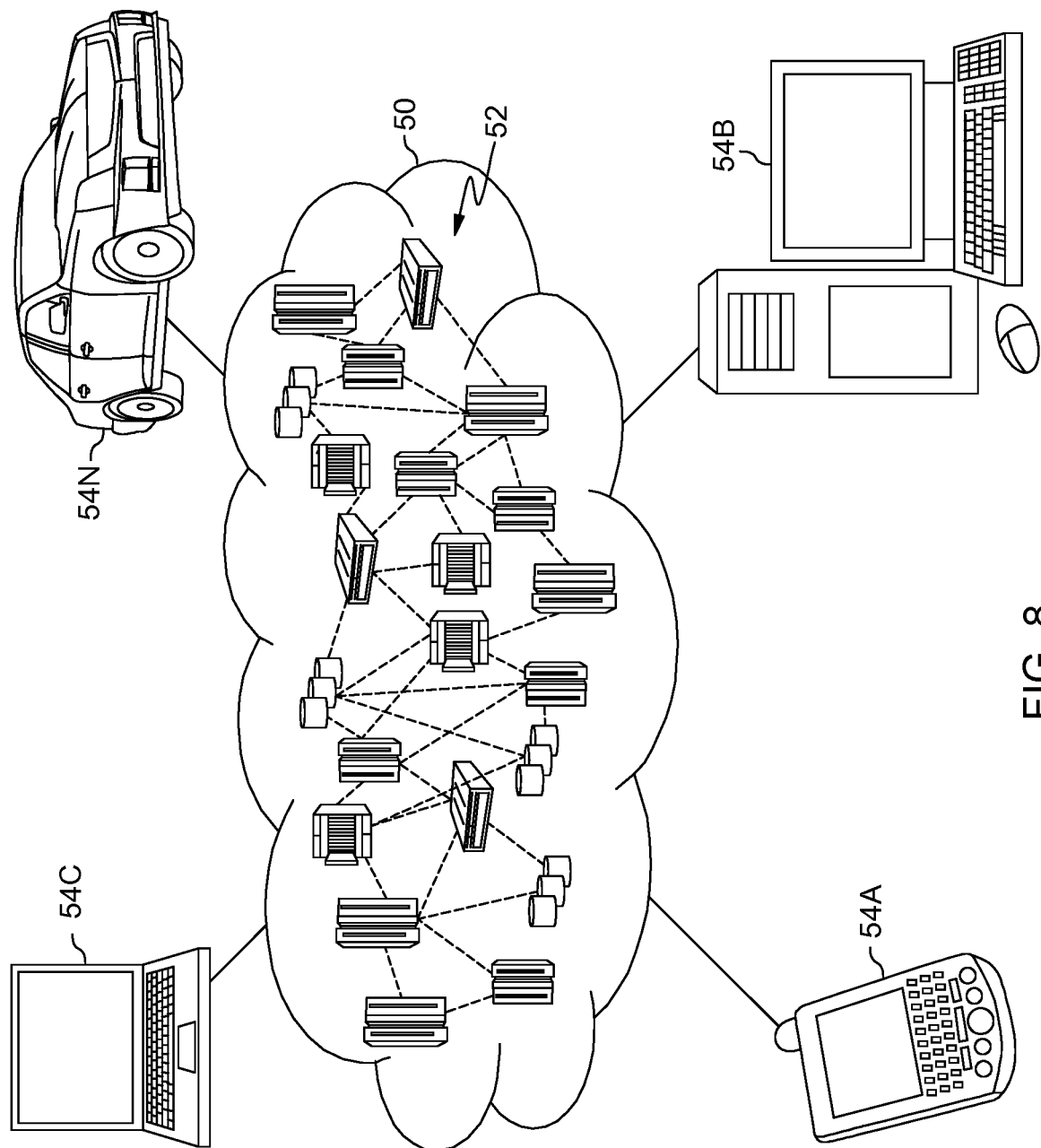
FIG. 8 depicts one embodiment of a cloud computing environment, in accordance with one or more aspects of the present invention.

Referring now to FIG. 8, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 52 and cloud computing environment 50 can communicate with any type of computerized device over any type of network and/or network addressable connection (e.g., using a web browser).

Figure 9:
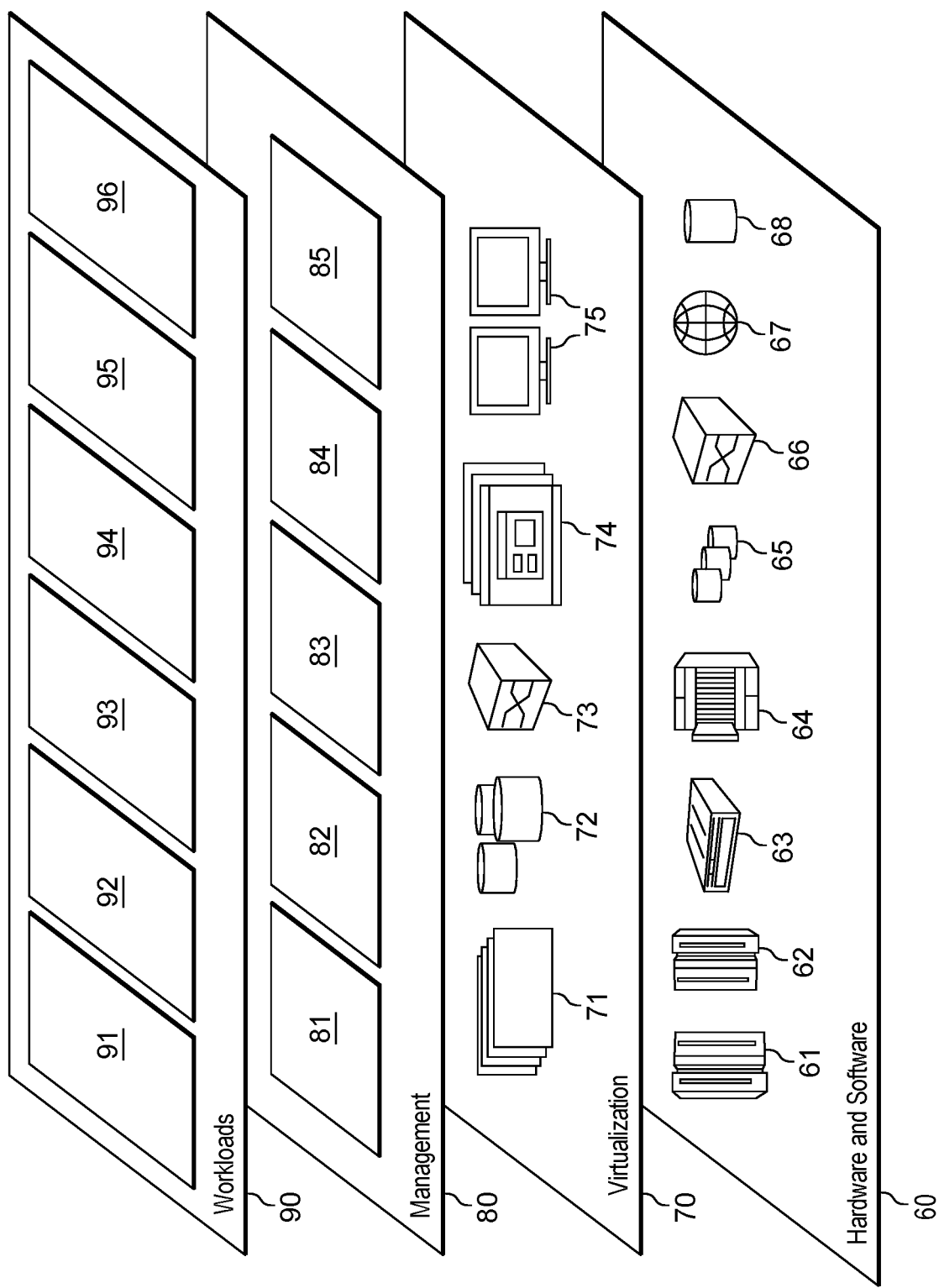
FIG. 9 depicts one example of abstraction model layers, in accordance with one or more aspects of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and command-type filtering processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, commands or operations may be used. Additionally, different types of indications or tags may be specified, as well as different types of filtering modes and/or adjunct processors. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    at least one computer readable storage medium and program instructions collectively stored on the at least one computer readable storage medium to perform a method comprising:
        obtaining a command to be executed;
        determining based, at least, on obtaining the command to be executed, that a target adjunct processor of a plurality of adjunct processors of the computing environment does not support a selected command-type filtering mode;
        checking that another adjunct processor of the plurality of adjunct processors supports the selected command-type filtering mode; and
        executing obtained command under the selected command-type filtering mode, based on determining that the target adjunct processor does not support the selected command-type filtering mode and based on the other adjunct processor supporting the selected command-type filtering mode, wherein the executing the obtained command under the selected command-type filtering mode includes:
            forwarding the obtained command to the other adjunct processor for processing to determine whether the command is valid for execution in the selected command-type filtering mode;
            obtaining an indication, based on processing at the other adjunct processor, of whether the command is valid for execution in the selected command-type filtering mode; and
            sending the obtained command to the target adjunct processor for execution, based on obtaining an indication that the command is valid for execution in the selected command-type filtering mode.

2. The computer program product of claim 1, wherein the method further comprises rejecting the command as invalid for the selected command-type filtering mode and refraining from executing the command on the target adjunct processor, based on obtaining an indication that the command is invalid for the selected command-type filtering mode.

3. The computer program product of claim 2, wherein the rejecting further comprises placing an error code in a central location to facilitate access to the error code.

4. The computer program product of claim 1, wherein the method further comprises:
    adding the command to a command list as a selected command-type filtering mode command, based on obtaining the indication that the command is valid for the selected command-type filtering mode, the command list to be used to determine which commands are valid for execution on the target adjunct processor.

5. The computer program product of claim 1, wherein the method further comprises rejecting the command based on determining that the plurality of adjunct processors is not configured to support the selected command-type filtering mode.

6. The computer program product of claim 1, wherein the method further comprises:
    determining, based on determining that the target adjunct processor does not support the selected command-type filtering mode and based on the other adjunct processor supporting the selected command-type filtering mode, that the command is not on a command list, the command list to be used to determine whether the command is to be executed on the target adjunct processor; and
    forwarding the command to the other adjunct processor for processing, based on determining that the command is not on the command list.

7. The computer program product of claim 6, wherein the method further comprises adding the command to the command list as a valid selected command-type filtering mode command, based on successful execution of the command on the other adjunct processor.

8. The computer program product of claim 6, wherein the method further comprises adding the command to the command list as a valid adjunct processor command, based on unsuccessful execution of the command on the other adjunct processor.

9. The computer program product of claim 1, wherein the selected command-type filtering mode is a stateless command filtering mode.

10. The computer program product of claim 1, wherein the plurality of adjunct processors comprises a plurality of cryptographic cards.

11. A computer system for facilitating processing within a computing environment, the computer system comprising:
    a memory; and
    at least one processor in communication with the memory, wherein the computer system is configured to perform a method, said method comprising:
        obtaining a command to be executed,
        determining, based, at least, on obtaining the command to be executed, that a target adjunct processor of a plurality of adjunct processors of the computing environment does not support a selected command-type filtering mode;
        checking that another adjunct processor of the plurality of adjunct processors supports the selected command-type filtering mode; and
        executing the obtained command under the selected command-type filtering mode, based on determining that the target adjunct processor does not support the selected command-type filtering mode and based on the other adjunct processor supporting the selected command-type filtering mode, wherein the executing the obtained command under the selected command-type filtering mode includes:
forwarding the obtained command to the other adjunct processor for processing to determine whether the command is valid for execution in the selected command-type filtering mode;
obtaining an indication, based on processing at the other adjunct processor, of whether the command is valid for execution in the selected command-type filtering mode; and
sending the obtained command to the target adjunct processor for execution, based on obtaining an indication that the command is valid for execution in the selected command-type filtering mode.

12. The computer system of claim 11, wherein the method further comprises rejecting the command as invalid for the selected command-type filtering mode and refraining from executing the command on the target adjunct processor, based on obtaining an indication that the command is invalid for the selected command-type filtering mode.

13. The computer system of claim 11, wherein the method further comprises:
adding the command to a command list as a selected command-type filtering mode command, based on obtaining the indication that the command is valid for the selected command-type filtering mode, the command list to be used to determine which commands are valid for execution on the target adjunct processor.

14. The computer system of claim 11, wherein the method further comprises rejecting the command based on determining that the plurality of adjunct processors is not configured to support the selected command-type filtering mode.

15. The computer system of claim 11, wherein the method further comprises:
determining, based on determining that the target adjunct processor does not support the selected command-type filtering mode and based on the other adjunct processor supporting the selected command-type filtering mode, that the command is not on a command list, the command list to be used to determine whether the command is to be executed on the target adjunct processor; and
forwarding the command to the other adjunct processor for processing, based on determining that the command is not on the command list.

16. A computer-implemented method of facilitating processing within a computing environment, the computer-implemented method comprising:
obtaining a command to be executed;
determining, based, at least, on obtaining the command to be executed, that a target adjunct processor of a plurality of adjunct processors of the computing environment does not support a selected command-type filtering mode;
checking that another adjunct processor of the plurality of adjunct processors supports the selected command-type filtering mode; and
executing the obtained command under the selected command-type filtering mode, based on determining that the target adjunct processor does not support the selected command-type filtering mode and based on the other adjunct processor supporting the selected command-type filtering mode, wherein the executing the obtained command under the selected command-type filtering mode includes:
forwarding the obtained command to the other adjunct processor for processing to determine whether the command is valid for execution in the selected command-type filtering mode;
obtaining an indication, based on processing at the other adjunct processor, of whether the command is valid for execution in the selected command-type filtering mode; and
sending the obtained command to the target adjunct processor for execution, based on obtaining an indication that the command is valid for execution in the selected command-type filtering mode.

17. The computer-implemented method of claim 16, further comprising rejecting the command as invalid for the selected command-type filtering mode and refraining from executing the command on the target adjunct processor, based on obtaining an indication that the command is invalid for the selected command-type filtering mode.

18. The computer-implemented method of claim 16, further comprising:
adding the command to a command list as a selected command-type filtering mode command, based on obtaining the indication that the command is valid for the selected command-type filtering mode, the command list to be used to determine which commands are valid for execution on the target adjunct processor.

19. The computer-implemented method of claim 16, further comprising rejecting the command based on determining that the plurality of adjunct processors is not configured to support the selected command-type filtering mode.

20. The computer-implemented method of claim 16, further comprising:
determining, based on determining that the target adjunct processor does not support the selected command-type filtering mode and based on the other adjunct processor supporting the selected command-type filtering mode, that the command is not on a command list, the command list to be used to determine whether the command is to be executed on the target adjunct processor; and
forwarding the command to the other adjunct processor for processing, based on determining that the command is not on the command list.

21. The computer-implemented method of claim 16, further comprising adding the command to a command list as a valid adjunct processor command based on obtaining an indication that the command is invalid for the selected command-type filtering mode, the command list to be used to determine which commands are valid for execution on the target adjunct processor.

22. The computer system of claim 11, wherein the method further comprises adding the command to a command list as a valid adjunct processor command based on obtaining an indication that the command is invalid for the selected command-type filtering mode, the command list to be used to determine which commands are valid for execution on the target adjunct processor.

23. The computer program product of claim 1, wherein the method further comprises adding the command to a command list as a valid adjunct processor command based on obtaining an indication that the command is invalid for the selected command-type filtering mode, the command list to be used to determine which commands are valid for execution on the target adjunct processor.

24. A computer program product for facilitating processing within a computing environment, the computer program product comprising:
- at least one computer readable storage medium and program instructions collectively stored on the at least one computer readable storage medium to perform computer operations comprising:
    - obtaining a command to be executed;
    - determining, based, at least, on obtaining the command to be executed, that a target adjunct processor of a plurality of adjunct processors of the computing environment does not support a selected command-type filtering mode;
    - checking that another adjunct processor of the plurality of adjunct processors does support the selected command-type filtering mode; and
    - executing the obtained command under the selected command-type filtering mode, based on determining that the target adjunct processor does not support the selected command-type filtering mode and based on the other adjunct processor supporting the selected command-type filtering mode, wherein the executing the obtained command under the selected command-type filtering mode includes:
        - forwarding the obtained command to the other adjunct processor for processing to determine whether the command is valid for execution in the selected command-type filtering mode;
        - obtaining an indication, based on processing at the other adjunct processor, that the command is valid for execution in the selected command-type filtering mode;
        - adding the obtained command to a command list as a valid selected command-type filtering mode command, based on obtaining the indication that the command is valid for execution in the selected command-type filtering mode, the command list used to determine whether the command is executable on the target adjunct processor; and
        - sending the obtained command to the target adjunct processor for execution, based on obtaining the indication that the command is valid for execution in the selected command-type filtering mode.

25. The computer program product of claim 24, wherein the computer operations further comprise determining that the obtained command is not on the command list, and wherein the executing the command under the selected command-type filtering mode is performed based on determining that the obtained command is not on the command list.

* * * * *